Dec. 2, 1969    J. LOPEZ    3,481,598
SHEET CONVEYING, STACKING AND DISCHARGE EQUIPMENT
Filed Feb. 2, 1968    14 Sheets-Sheet 1

INVENTOR
JOHN LOPEZ
BY
ATTORNEY

Dec. 2, 1969  J. LOPEZ  3,481,598
SHEET CONVEYING, STACKING AND DISCHARGE EQUIPMENT
Filed Feb. 2, 1968  14 Sheets-Sheet 2

INVENTOR
JOHN LOPEZ
BY
ATTORNEY

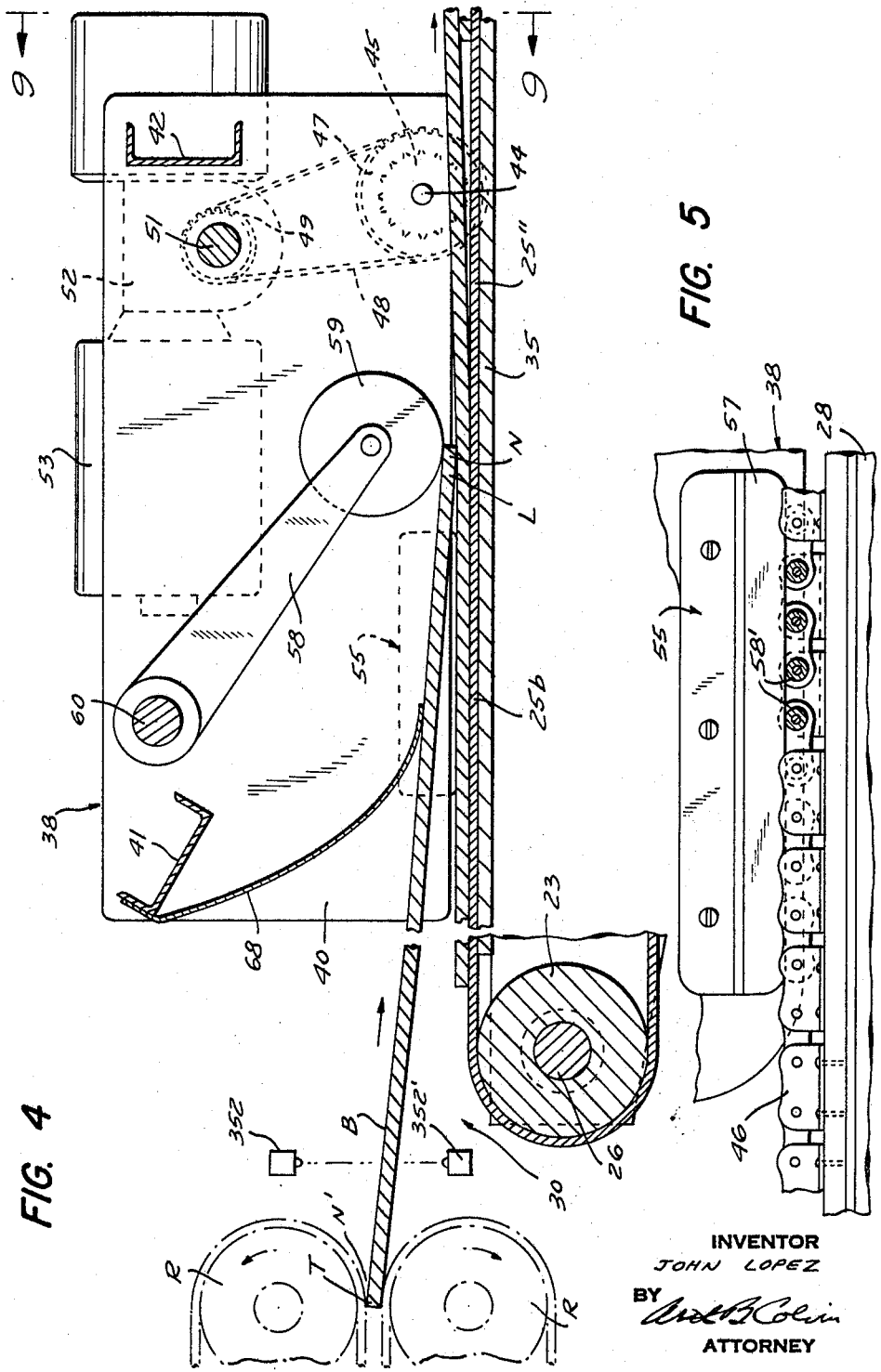

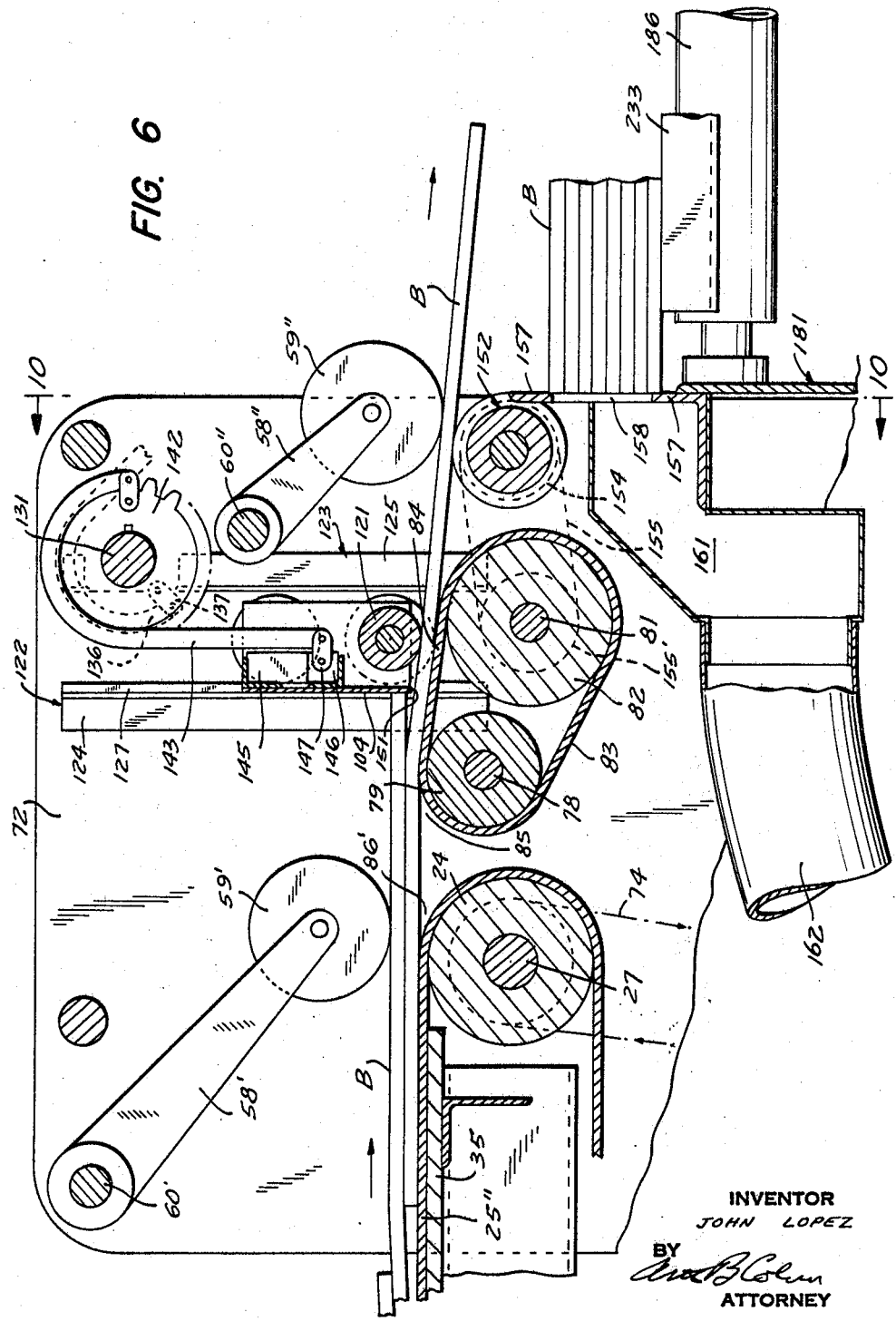

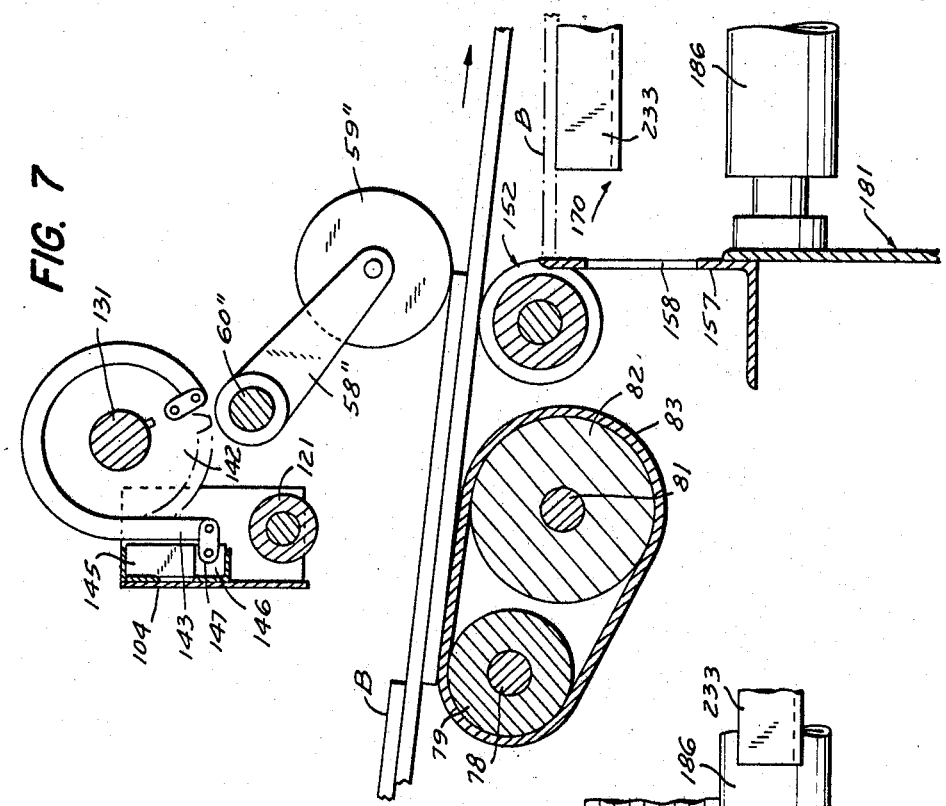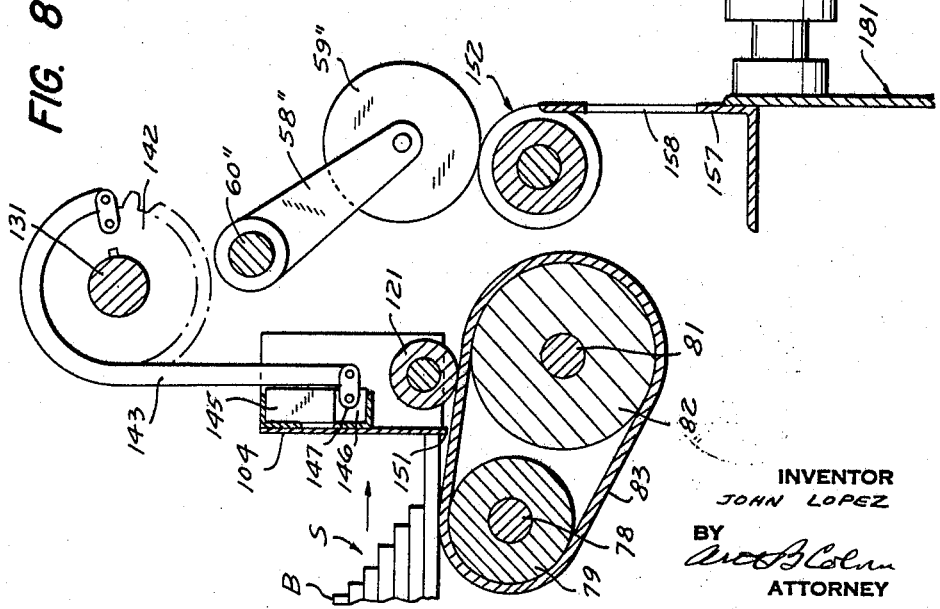

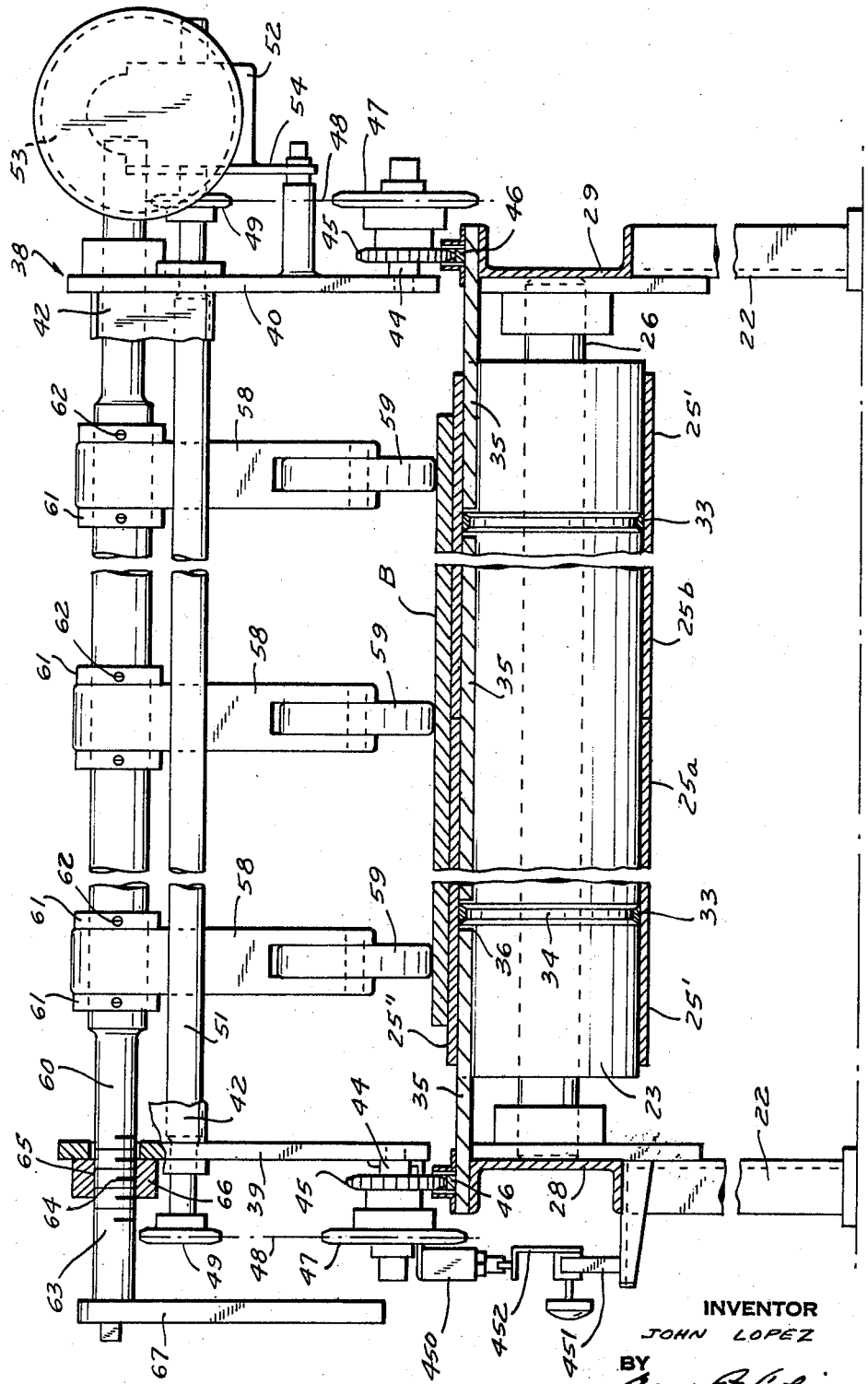

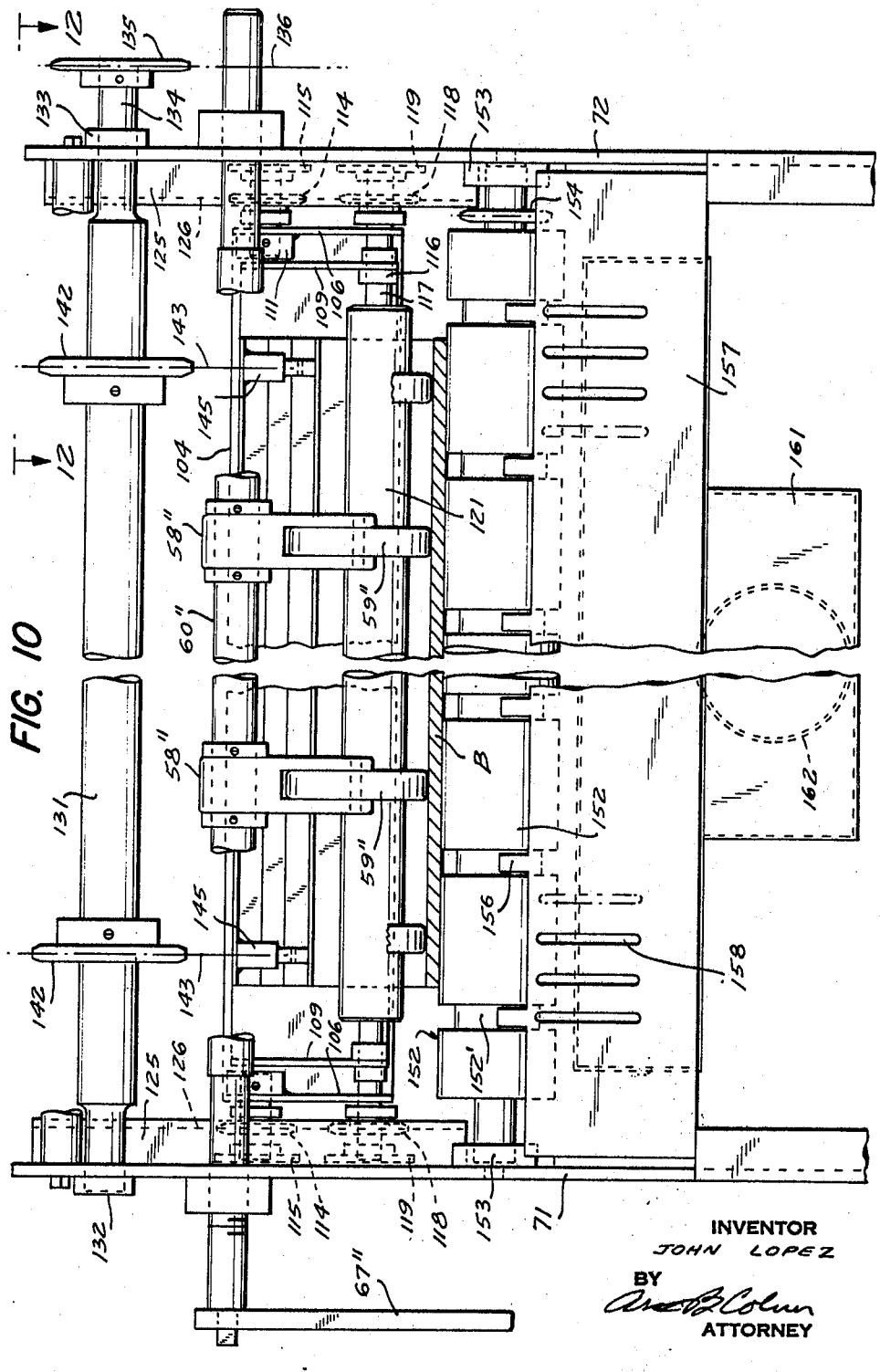

Dec. 2, 1969   J. LOPEZ   3,481,598
SHEET CONVEYING, STACKING AND DISCHARGE EQUIPMENT
Filed Feb. 2, 1968   14 Sheets-Sheet 9

INVENTOR
JOHN LOPEZ
BY
ATTORNEY

INVENTOR
JOHN LOPEZ

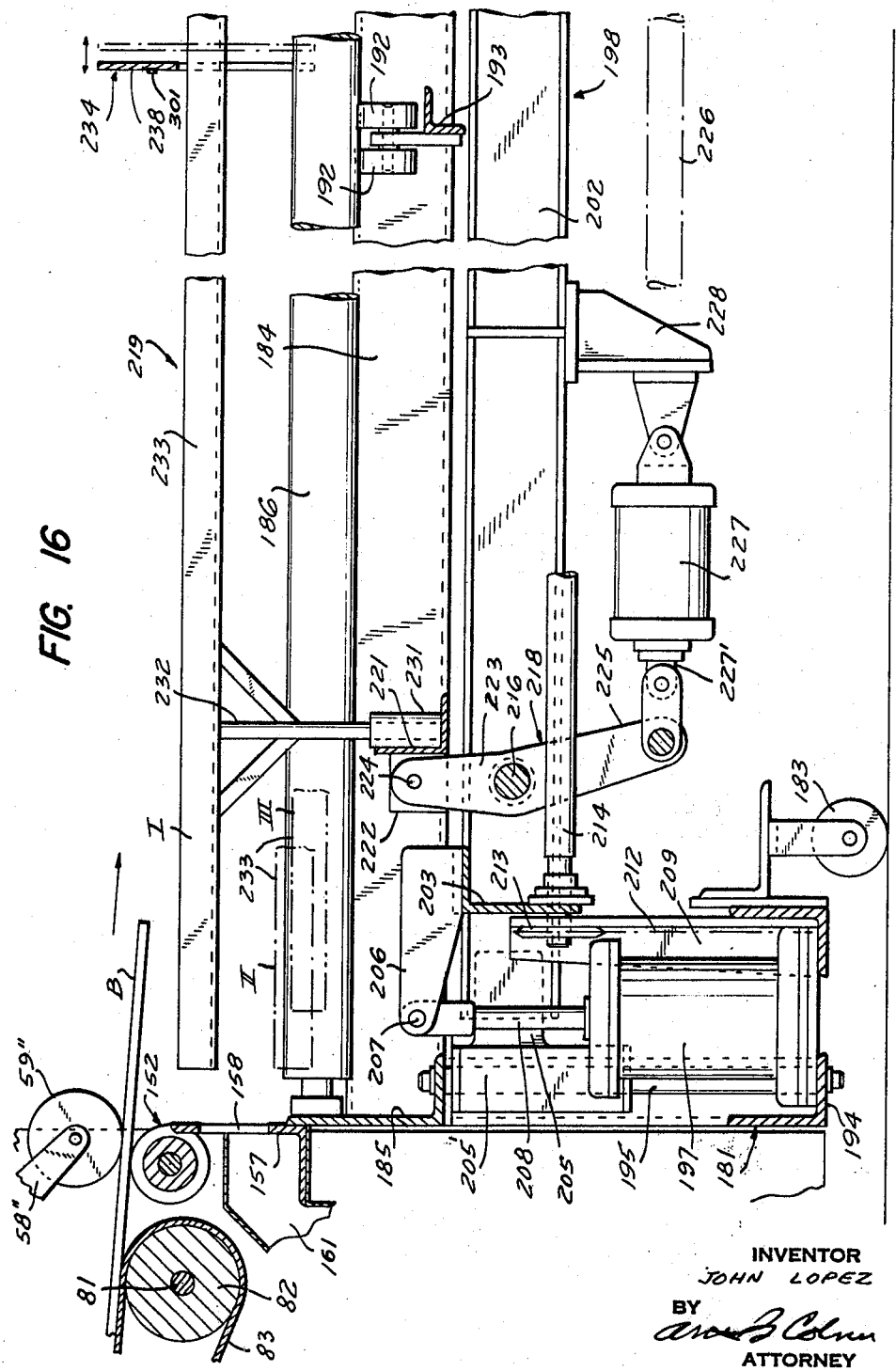

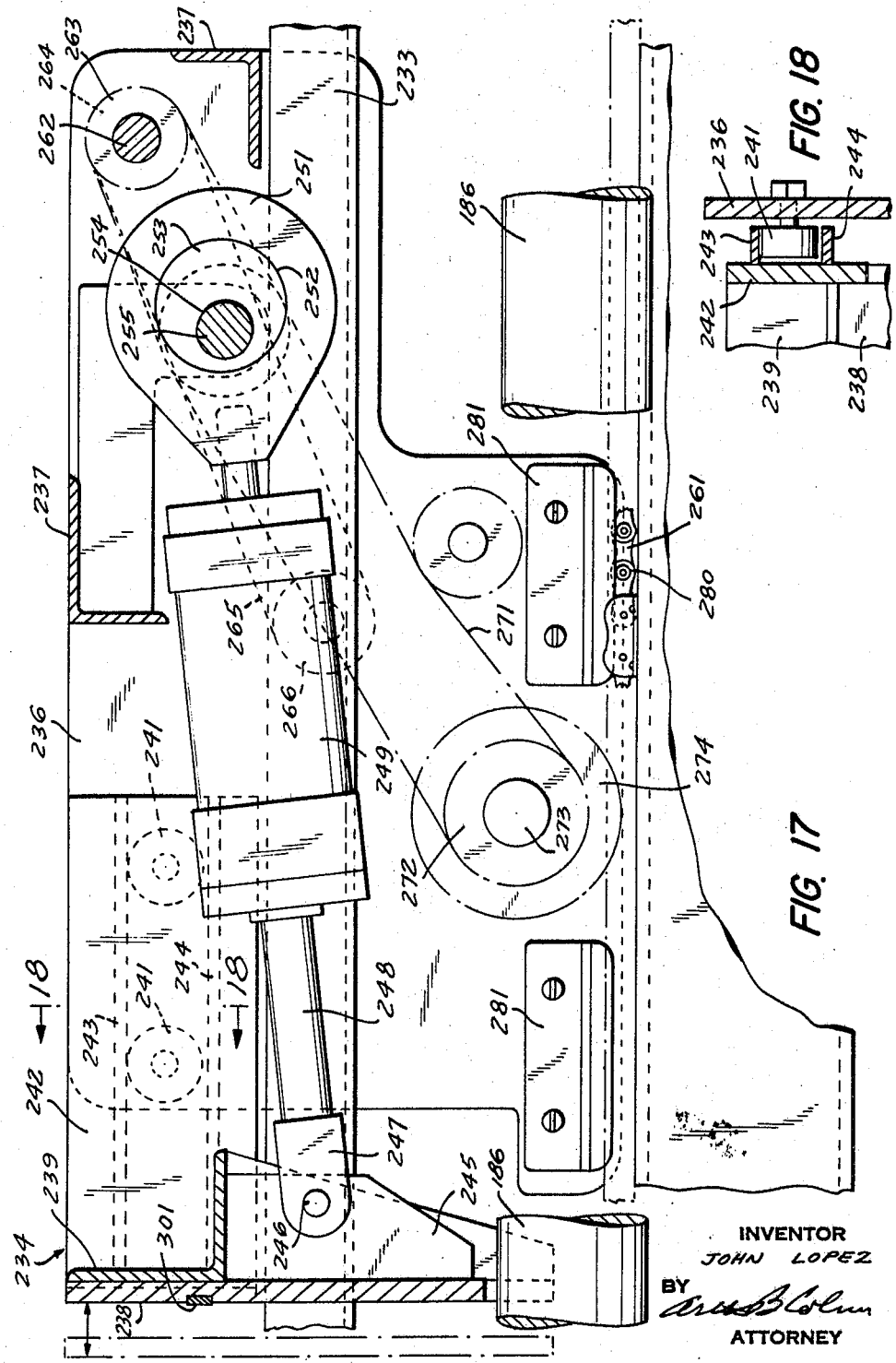

Dec. 2, 1969  J. LOPEZ  3,481,598
SHEET CONVEYING, STACKING AND DISCHARGE EQUIPMENT
Filed Feb. 2, 1968  14 Sheets-Sheet 13

INVENTOR
JOHN LOPEZ
BY
ATTORNEY

Dec. 2, 1969  J. LOPEZ  3,481,598
SHEET CONVEYING, STACKING AND DISCHARGE EQUIPMENT
Filed Feb. 2, 1968  14 Sheets-Sheet 14

INVENTOR
JOHN LOPEZ
BY
ATTORNEY

United States Patent Office 3,481,598
Patented Dec. 2, 1969

3,481,598
SHEET CONVEYING, STACKING AND
DISCHARGE EQUIPMENT
John Lopez, Westfield, N.J., assignor to Universal
Corrugated Box Machinery Corporation, Cranford, N.J., a corporation of New Jersey
Filed Feb. 2, 1968, Ser. No. 702,717
Int. Cl. B65h 29/68, 3/04, 3/34
U.S. Cl. 271—68                                    47 Claims

ABSTRACT OF THE DISCLOSURE

This invention relates to the art of sheet conveying, stacking and discharge equipment and more particularly to an equipment which will receive flat sheets of corrugated board which are delivered at a high rate of speed and thereupon slow down the rate of speed of such sheets without reducing their speed of delivery, and then will form uniform stacks of such sheets and discharge such stacks.

---

As conducive to an understanding of the invention, it is noted that in the formation of corrugated board, in the first stage of operation a conventional corrugator machine will form a continuous strip of corrugated board at a relatively high rate of speed.

The strip of corrugated board as it is discharged from the corrugator is passed through a slitter and cut off machine which forms individual corrugated sheets of the desired length and width.

Since the slitter and cut off machine is synchronized with the corrugator, it will deliver the individual sheets at a high rate of speed.

Where the discharge of the slitter and cut off machine is onto a table from which the sheets are manually removed and formed into uniform stacks, the operation required a large number of workers to handle the high rate of output.

This operation is extremely difficult in view of the fact that the corrugated sheets often are relatively large in size and require two men to handle each sheet. Furthermore, due to the speed of delivery, the manually formed stacks are not uniform, so that when loaded on pallets, for example, for transportation to subsequent processing equipment, the stacks often fall off the pallets with attendant delays in processing.

Where the sheets are automatically fed by a conveyor unit to a takeup unit on which a stack is to be formed and such stack is relatively large so that the sheets discharged from the conveyer unit must drop a considerable distance as the stack is built up, due to the large surface area of the sheet, it tends to float as it moves downwardly and will skew with the result that a non-uniform stack is built up with the difficulties above noted.

It is accordingly among the objects of the invention to provide a sheet conveying unit which is relatively simple in construction and which can receive sheets of corrugated board delivered thereto at a relatively high rate of speed and thereupon slow down the rate of advance of such sheets while still maintaining the same in longitudinal alignment and then discharge such sheets onto a suitable takeoff unit with assurance that the sheets thus discharged will remain in substantial alignment so that uniform stacks will be formed on such takeoff unit.

According to the invention, a conveyer unit is provided comprising an endless belt driven in timed relation with the slitting and cut off machine, for example, but at a speed that is a fraction of such speed so that such sheets will be advanced by the conveyor in shingled relation. The conveyer has means to retain the shingled sheets thereon in longitudinally aligned relation so that they will be advanced without skewing.

The outlet end of the conveyer is provided with a gate mechanism having a separate conveyer unit associated therewith, which receives the sheets advanced by the first conveyer and advances such sheets for discharge onto a takeoff unit. The gate mechanism includes a vertically movable gate beneath which the sheets will pass when the gate is lifted and which will restrain advance of the sheets when the gate is lowered.

Among the features of the invention are means to insure that the discharge of sheets from the conveyer onto the takeoff unit will be at a given minimum rate of speed regardless of the speed at which the conveyer is being driven to insure that the sheets that are discharged will not jam up at the outlet of the conveyer but will be dependably discharged onto the takeoff unit.

The takeoff unit is designed to receive the sheets as they are discharged from the conveyer unit and to form a uniform stack of such sheets. As the stack builds up, a supporting member on which the stack is formed will gradually be lowered and after a predetermined number of sheets has been collected in the stack, the gate will be lowered and the supporting member will thereafter be lowered to deposit the stack onto a set of rollers which when subsequently actuated will remove the stack from the takeoff unit.

In the accompanying drawings in which is shown one of various possible embodiments of the several features of the invention, FIG. 1 is a side elevational view of the conveyer unit and takeoff unit;

FIG. 4 is an enlarged sectional view taken along line 4—4 of FIG. 2 showing the inlet end of the conveyer unit;

FIG. 5 is a fragmentary detail view taken along line 5—5 of FIG. 2 showing the mount for the holddown wheel carriage of the conveyer unit;

FIG. 6 is a fragmentary detail view taken along line 6—6 of FIG. 2 showing the outlet end of the conveyer unit and the gate assembly;

FIG. 7 is a fragmentary detail view of the outlet end of the conveyer unit with the gate in raised position;

FIG. 8 is a view similar to FIG. 7 with the gate in lowered position;

FIG. 9 is a transverse sectional view taken along line 9—9 of FIG. 4;

FIG. 10 is a view similar to FIG. 9, but taken along line 10—10 of FIG. 6;

FIG. 16 is a sectional view taken along line 16—16 of FIG. 15;

FIG. 17 is a sectional view taken along line 17—17 of FIG. 15;

FIG. 18 is a detail sectional view taken aolng line 18—18 of FIG. 17;

Figure 1:
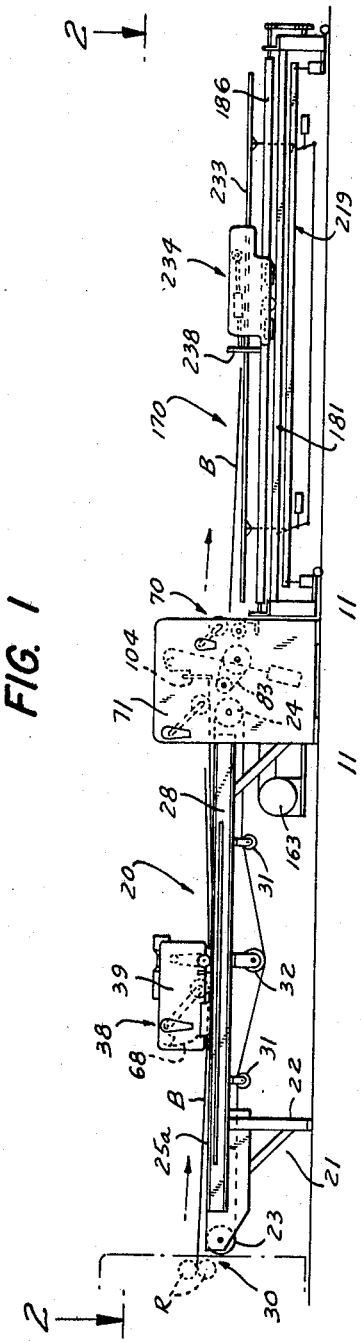
Figure 3:
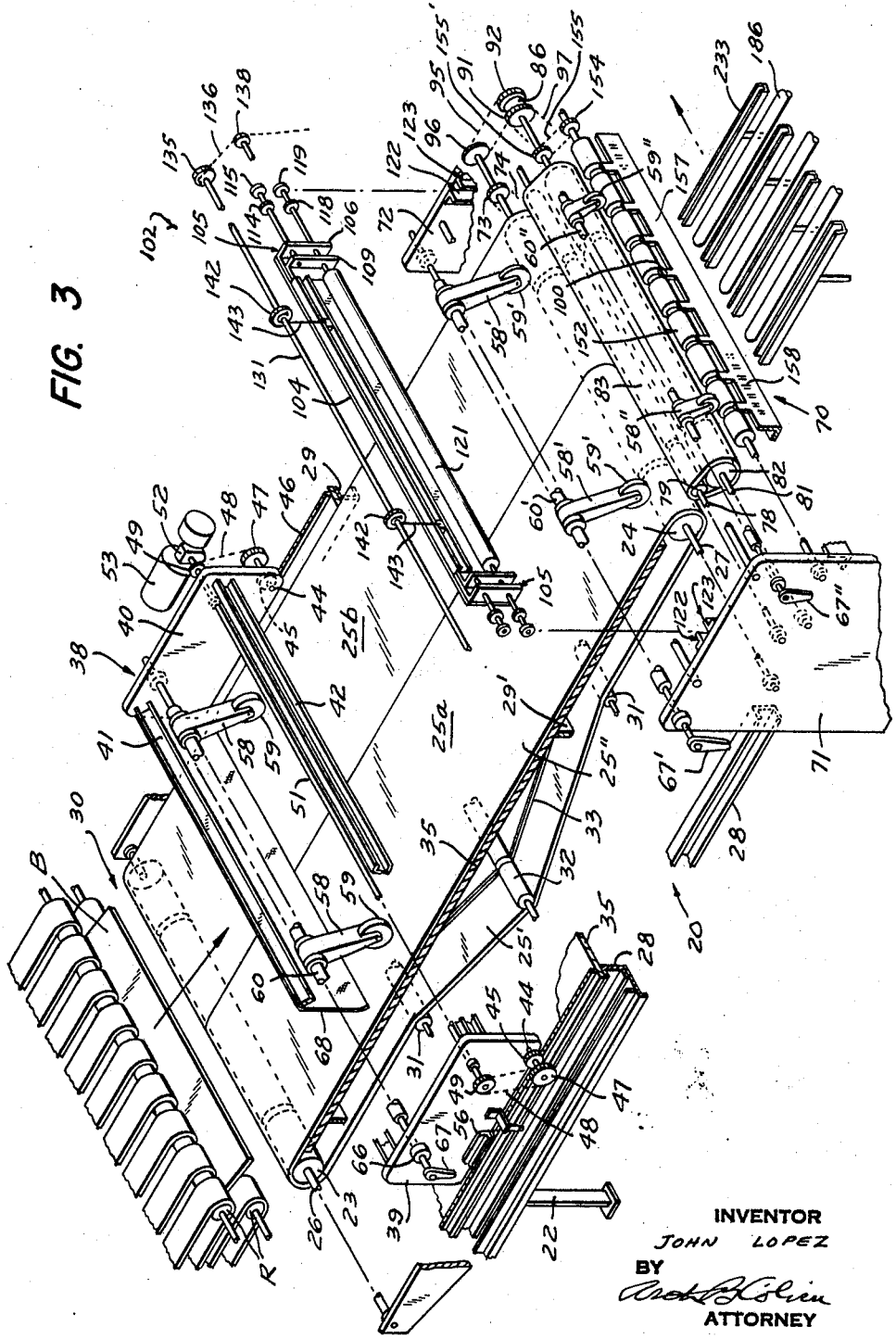
FIG. 3 is an exploded schematic perspective view of the conveyer unit.

Referring now to the drawings, as shown in FIGS. 1 and 3, the slow down conveyer unit 20 comprises a frame 21 supported by legs 22, the frame 21 having elongated transversely extending rollers 23, 24 at its respective ends, which mount a pair of parallel endless conveyer belts 25a, 25b, FIG. 3. The rollers 23, 24 are mounted on shafts 26, 27 supported on the side beams 28, 29 of the frame, the roller 23 illustratively being an idler roller and the roller 24 being driven.

As shown in FIG. 3, the lower runs 25' of the conveyer belts 25a, 25b ride over transversely extending support rollers 31 and the belts are maintained under tension by a transversely extending tension roller 32 interposed between the support rollers 31.

In order to maintain the conveyer belts 25a, 25b, in longitudinally aligned parallel relation, each of the belts has a narrow V belt 33 (FIGS. 3 and 9) secured to its inner surface which rides in corresponding V grooves 34 in the rollers 23, 24 as well as in the tension roller 32.

To provide a firm support for the upper run 25" of the conveyer belts 25a, 25b, a plurality of parallel elongated rigid plates 35, illustratively of Masonite, are provided, mounted on the side beams 28, 29 and transverse beams 29' of the frame as shown in FIGS. 3 and 9 for example, the spaces 36 between adjacent plates 35 receiving the V belts 33 as shown in FIG. 9.

Mounted on the frame 21 adjacent the inlet end 30 of the conveyer unit 20 is a carriage 38 (FIGS. 1, 3, 4) which comprises a pair of substantially rectangular side plates 39, 40 rigidly secured together in spaced parallel relation by transverse beams 41, 42.

The carriage 38 extends transversely across the conveyer belts 25a, 25b as shown in FIGS. 3 and 9 with the side plates 39, 40 substantially vertically aligned with the side beams 28, 29 (FIG. 9) and is suitably mounted so that it may be moved longitudinally of the conveyer belts toward and away from the inlet 30.

To this end, as shown in FIGS. 3 and 9, each of the plates 39, 40 at its lower edge mounts an outwardly extending stud shaft 44 on which a sprocket wheel 45 is rotatably mounted, said sprocket wheel riding on an associated sprocket chain 46 secured to the outer edge of plate 35. Rotatable with each of said sprocket wheels 45 and also mounted on shafts 44 is a second sprocket wheel 47 connected by associated sprocket chains 48 to sprocket wheels 49 secured to a shaft 51 extending transversely through plates 39, 40 and rotatably mounted thereon. The shaft 51 is driven through speed reducer 52 by a motor 53 mounted on plate 40 by brackets 54.

As above described, the carriage 38 is advanced by rotation of the sprocket wheels 45. The carriage is also supported as shown in FIG. 5, by a Z-shaped angle member 56 which is secured to the outer surface of each of the plates 39, 40 at its lower edge. The angle member 56 has a depending flange 57 which rides on rollers 55 interposed between the links of the sprocket chain 46.

The carriage 38 supports a plurality of hold down arms 58 each having a roller 59 at its lower end and an opening at its upper end through which extends an elongated shaft 69 (FIG. 9). The arms 58 are spaced on shaft 60 by intervening collars 61 secured by set screws 62. One end 63 of shaft 60 is threaded as at 64 and rotatably mounted in a suitably threaded opening 65 in block 66 carried by the plate 39, and extends beyond said plate 39. The extending end of arm 60 carries a reversible ratchet arm 67 so that upon actuation of arm 67 the shaft 60 and roller arms 58 may be moved transversely.

The cross beam 41 mounts an elongated deflector apron 68 which extends between the side plates 39, 40 and normally rests on conveyer belts 25a, 25b so that the sheet B discharged into the inlet 30 of the conveyer will strike the deflector apron 68 and not only will be guided downwardly beneath the rollers 59, but will be squared.

As shown in FIG. 4, the position of the carriage is adjusted so that when the leading edge L of a sheet B has just entered the nip N between the rollers 59 and conveyer belts 25, the trailing edge T of the sheet B is just leaving the nip N' between the discharge rollers R of the preceding machine.

The speed of the conveyer belts 25 is illustratively one-half that of the speed of the discharge rollers R. As a result, the sheets B will be shingled as they are advanced by the conveyer belts 25a, 25b, being retained in position on such belts by the rollers 59.

Figure 11:
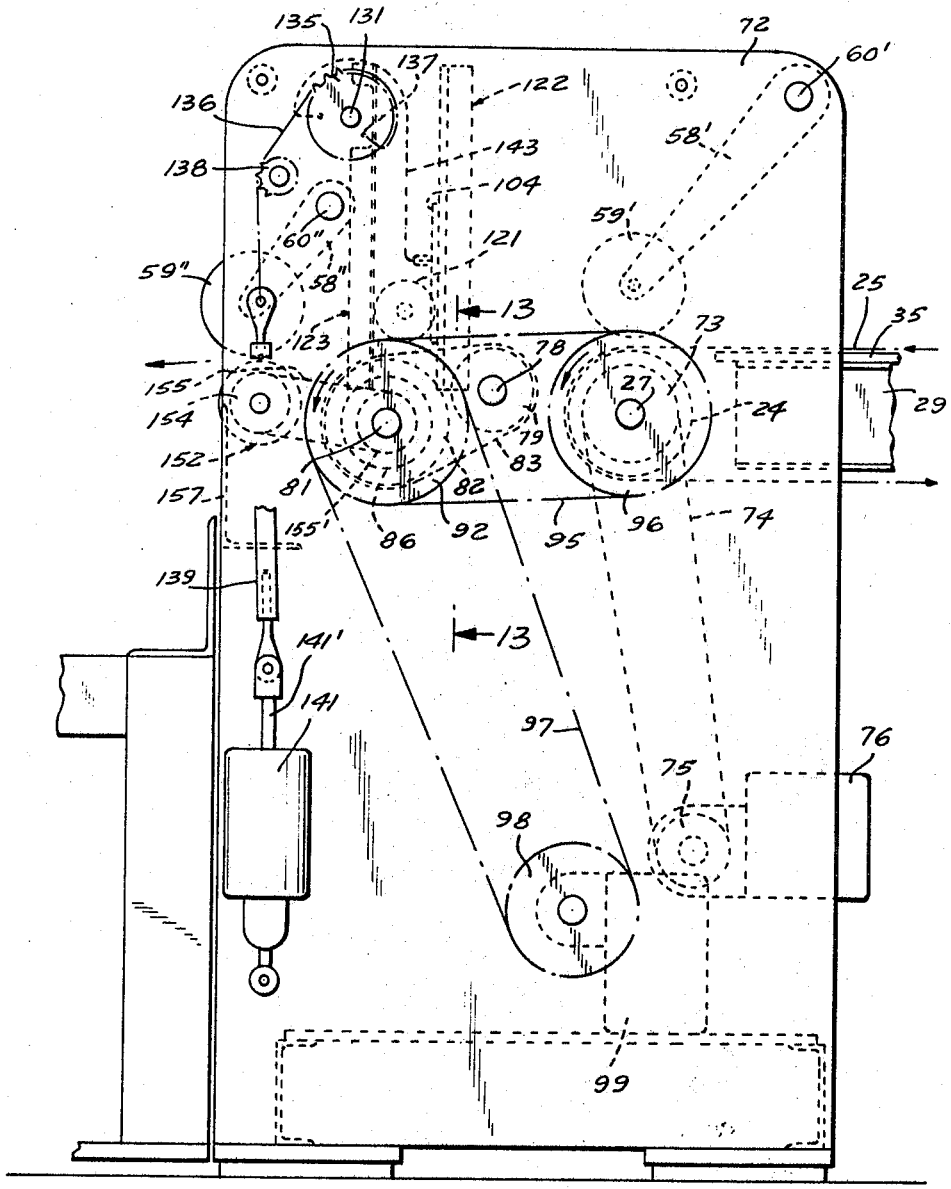
FIG. 11 is a side elevational view taken along line 11—11 of FIG. 2.

Positioned at the outlet end 70 of the conveyer and straddling the frame 21 is a pair of upright parallel plates 71, 72 having suitable bearings mounted thereon which rotatably mount the shaft 27. As shown in FIGS. 3 and 11, one end of shaft 27 mounts a sprocket wheel 73 which is connected by sprocket chain 74 to a drive sprocket wheel 75, the latter being driven by a suitable motor 76 at a predetermined speed determined by the speed of the corrugator and hence the speed of the discharge conveyer R.

Extending transversely across the conveyer belts 25 adjacent the upper edge of plates 71, 72 is a shaft 60' similar to shaft 60 and also mounting a plurality of hold down arms 58' and associated rollers 59'. The transverse position of shaft 60' may be adjusted by reversible ratchet arm 67', similar to ratchet arm 67. It is to be noted, as shown in FIG. 6, that the rollers 59' are normally aligned with the driven roller 24.

Extending transversely between the plates 71, 72 forwardly of the roller 24 is a shaft 78 carrying idler roller 79, the shaft 78 being rotatably mounted in suitable bearings on plates 71, 72.

Associated with shaft 79 is shaft 81 to which is secured a roller 82, the shaft 81 being supported in bearings carried by said plates 71, 72.

Riding around rollers 79 and 82 is a conveyer belt 83 which, as shown in FIG. 6, has its upper run 84 inclined downwardly with the inlet end 85 thereof substantially in the same plane as the outlet end 86' of conveyer belts 25.

Figures 13, 14:
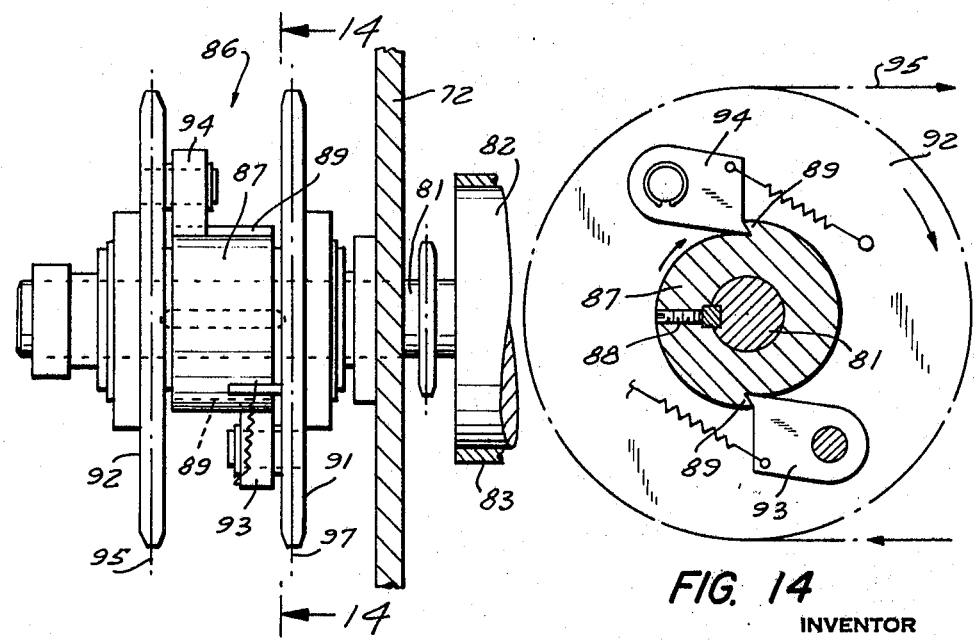
FIG. 13 is a detail sectional view taken along line 13—13 of FIG. 11.
FIG. 14 is a sectional view taken along line 14—14 of FIG. 13.

As shown in FIGS. 3 and 13, one end of shaft 81 extends beyond plate 72 and mounts a clutch assembly 86. As shown in FIG. 13, clutch 86 comprises a hub 87 secured to shaft 81 as by a key 88, the hub 87 having ratchet teeth 89 in its periphery. Freely rotatable on shaft 81 and straddling the hub 87 are sprocket wheels 91 and 92. Each of the sprocket wheels 91, 92 pivotally mounts a pawl 93, 94, spring urged against the periphery of hub 87 as shown in FIG. 14.

Thus, the shaft 91 will be rotated by whichever of the sprocket wheels 91, 92 is driven at the greater speed.

In the embodiment shown, the sprocket wheel 92 is connected by sprocket chain 95 to sprocket wheel 96 carried by roller shaft 27 so that the speed of sprocket wheel 92 will be determined by the speed of roller 82 driven by sprocket chain 74 and motor 76 and hence by the speed of conveyer 25.

The sprocket wheel 91 is connected by sprocket chain 97 to sprocket wheel 98 which is driven by motor 99 at a fixed rate of speed.

Thus, referring to FIG. 14, if the speed of the conveyer 25 is such to rotate sprocket wheel 92 at a speed faster than that of sprocket wheel 91, it is apparent that the pawl 94 will engage ratchet tooth 89 and rotate the hub 87 and shaft 81 faster than it will be driven by ratchet wheel 91 and pawl 93.

If the speed of the conveyer 25 should fall below the that of the sprocket wheel 91, then the sprocket wheel 91 and associated pawl 93 will take over so that the minimum speed will be that determined by the speed of rotation of sprocket wheel 91.

Associated with the speedup conveyer 83 is a gate assembly 102 shown in FIGS. 3, 6, 10, 11 and 12.

As shown in FIG. 3, the gate assembly comprises an elongated substantially rectangular plate 104 extending transversely across the frame 21 in substantially vertical position and as shown in FIG. 6, aligned with the central portion of the speed up conveyer belt 83.

Figure 12:
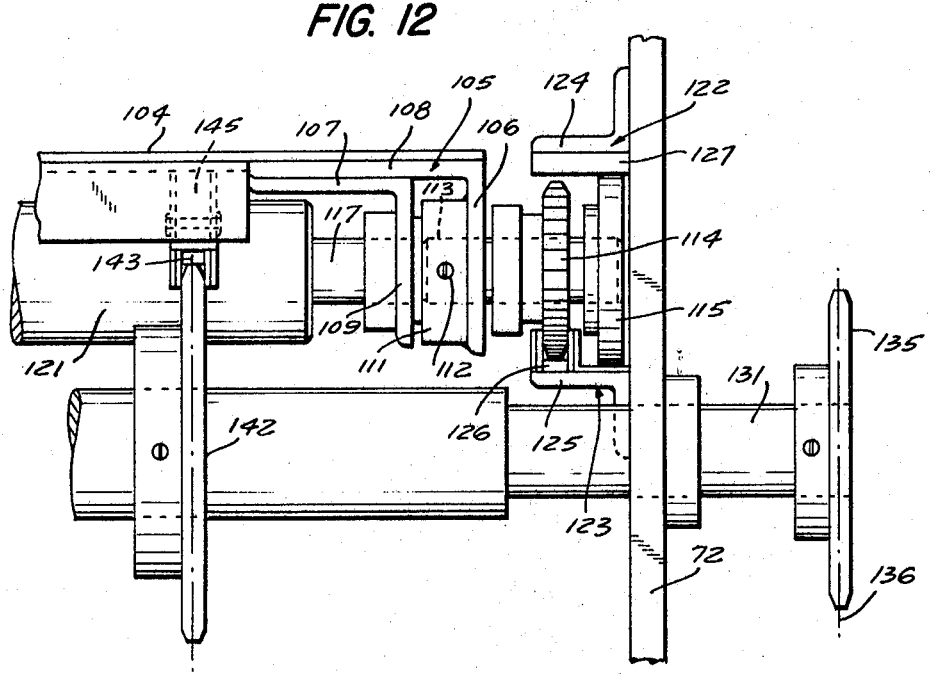
FIG. 12 is a detail sectional view taken along line 12—12 of FIG. 10.

As shown in FIGS. 3, 10 and 12, an L-shaped angle member 105 is secured to each end of the plate 104 with the leg 106 of member 105 extending outwardly therefrom at right angles thereto. A second L-shaped angle member 107 is secured to the leg 108 of each of the members 105 with th leg 109 of each member 107 extending outwardly at right angles to the plate 104 and parallel to and inwardly spaced from the leg 106 of member 105.

Secured to the inner side of each of the legs 106 of members 105 at the upper end thereof as shown in FIG. 12, is a block 111 in which is secured by set screw 112, a stud shaft 113 which extends outwardly from each of said legs 106. Rotatably mounted on each stud shaft, inwardly of its outer end is a sprocket wheel 114 and a disc 115 is rotatably mounted on the outer end of each stud shaft 113.

Each of the arms 109 has a bearing 116 (FIG. 10) secured to the inner side thereof through which extends a shaft 117, the latter also extending through associated openings in arms 106 and rotatably mounting a sprocket wheel 118 and a disc 119, vertically aligned with the sprocket wheel 114 and disc 115 respectively. A roller 121 is idly mounted on said shaft 117 to rotate independently of the latter.

In order vertically to guide the gate 104, a pair of L-shaped angle members 122, 123 (FIG. 12) are secured to the inner surface of plates 71, 72 with their legs 124, 125 in spaced parallel relation. The sprocket wheels 114 are adapted to engage a length of sprocket chain 126 secured to the leg 125 of each member 123 and the discs 115 are adapted to ride along a bar 127 secured to the leg 124 of each member 122. Thus, as the gate 104 is raised and lowered in the manner hereinafter to be descirbed, it will be retained in vertical alignment without tilting, by the coaction of the sprocket wheels 114 and discs 115 with the associated sprocket chains 126 and bars 127.

In the embodiment shown, the gate 104 is positively lifted and is lowered by gravity.

To this end, as shown in FIGS. 3, 10 and 12, a shaft 131 is provided which extends transversely across the frame, being supported at its ends in suitable bearings 132 and 133 (FIG. 10). The ends 134 of shaft 131 which extends beyond the bearing 133, has a sprocket wheel 135 secured thereto.

Riding over said sprocket wheel 135 is a sprocket chain 136 which has one end secured to the sprocket wheel as at 137 (FIG. 11). The chain rides over an idler sprocket 138 and has its free end secured to a turnbuckle 139 that in turn is secured to the piston 141' of an air cylinder 141.

Thus, when the piston of cylinder 141 is retracted, it will cause the sprocket wheel 135 to turn in a counter-clockwise direction from the position shown in FIG. 11, causing corresponding rotation of said shaft 131.

As shown in FIGS. 10, 11 and 12, the shaft 131 has two spaced sprocket wheels 142 secured thereto. A sprocket chain 143 is secured to each of such sprocket wheels 142 and rides over the latter, with the free ends of each chain being secured to the gate 104. To this end, as shown in FIGS. 6 and 10, a pair of blocks 145 are secured to the plate 104 inwardly spaced from the ends thereof. Each of the blocks is of reduced thickness at its lower end pivotally to mount a link 146 as at 147 to which the free end of each of the chains 143 are connected.

Thus, when the shaft 131 is rotated in a counter-clockwise direction, as shown in FIG. 11 (or clockwise) as shown in FIG. 6, corresponding rotation of the sprocket wheel 135 will cause upward movement to be imparted to each of the chains 143 and hence to the gate 104, rapidly to lift the latter.

When the air cylinder 141 is de-energized, the gate 104 will move downwardly by gravity, its downward movement being limited so that the roller 121 will engage the conveyor belt 83, with the lower edge 151 of the gate spaced from the upper run 84 of such belt 83 by a distance less than the thickness of the corrugated sheet B.

Rotatably mounted between the plates 71, 72 (FIG. 10) is a discharge roller 152, the ends of which are supported in bearings 153 mounted on said plates. The roller 152 mounts a sprocket wheel 154 near one end which carries an endless sprocket chain 155 that is driven by sprocket wheel 155' which is mounted on shaft 81 (FIG. 3).

The upper periphery of roller 152 (FIG. 6) is in a plane slightly below the plane of the portion of the upper run 84 of conveyor belt 83 riding around roller 82 and said roller 152 is spaced outwardly slightly from roller 82.

Means are provided to retain the sheets B against discharge roller 152 as they are advanced by conveyor 83. To this end, a plurality of spaced arms 58″ are provided, each carrying a roller 59″ at its free end substantially vertically aligned with said roller 152 (FIG. 6). The arms 58″ are mounted on a shaft 60″ in the same manner as the arms 58 and 58′ previously described and the transverse position of said arms is adjustable by a reversible ratchet arm 67″.

The roller 152 has a plurality of longitudinally spaced annular grooves 152' in its periphery to receive the upstanding fingers 156 of a vertical squaring plate or bar 157 which extends transversely across the frame 21 as shown in FIGS. 6 and 10.

The plate 157 has a plurality of vertical slots 158 extending across the length thereof and an air chamber 161 is associated with such slots and is connected through ducts 162 to a source of vacuum such as a motor driven fan 163 (FIG. 1).

The conveyor above described is designed to feed sheets of corrugated board onto a receiving table or takeoff unit 170 for subsequent stacking and processing.

According to another feature of the invention, the takeoff unit is designed not only to receive the sheets, but to form uniform stacks and to discharge such stacks in a direction at right angles to the direction in which they are initially discharged onto the takeoff unit.

Figure 15:
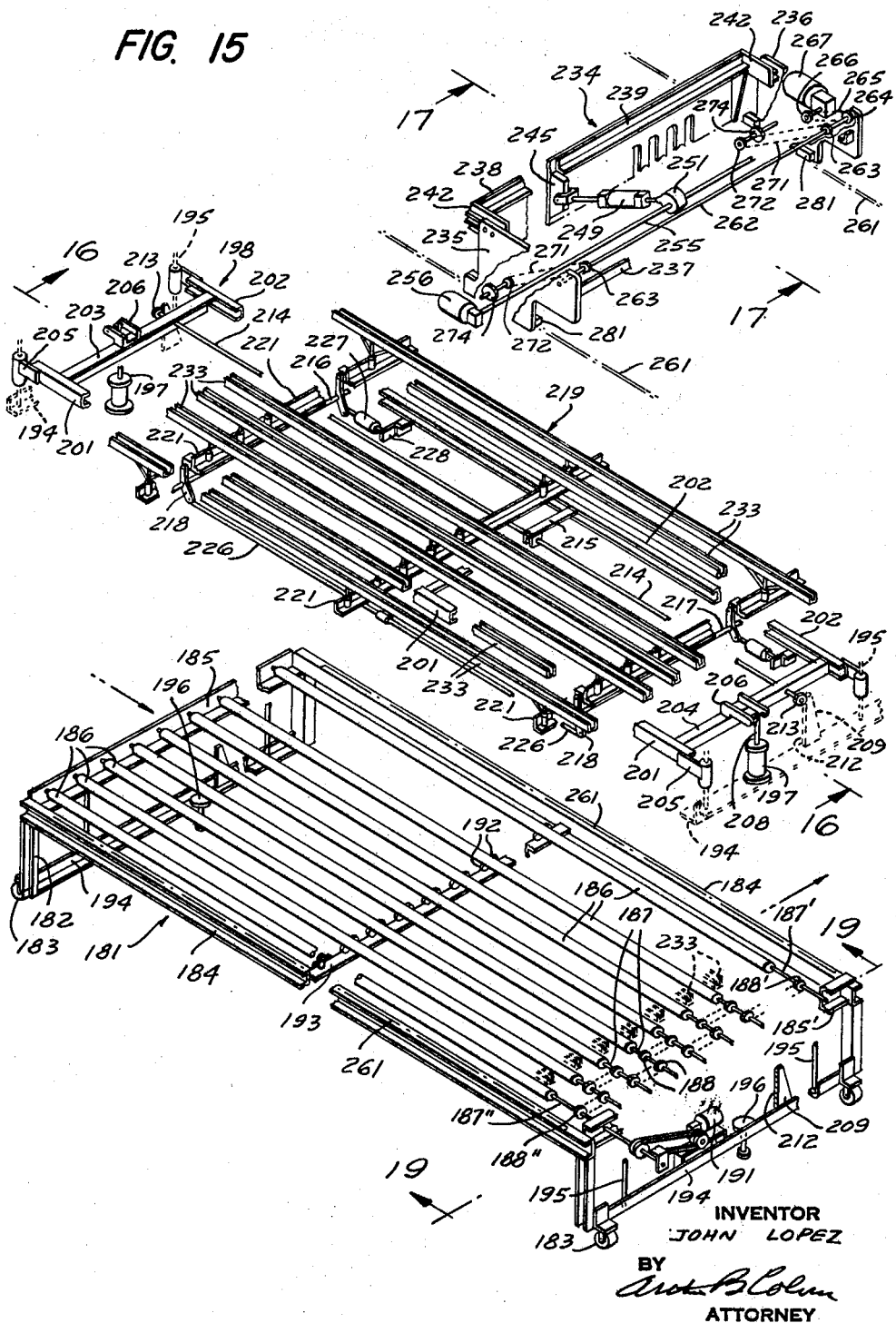
FIG. 15 is an exploded perspective view of the takeoff unit.

As shown in FIG. 15 of the drawings, the takeoff unit comprises a lower frame member 181 having upstanding legs 182 at each corner mounted on rollers 183 with the top of the frame member being defined by parallel side beams 184 and end beams 185. Extending longitudinally of the frame 181 between the side beams 184 are spaced parallel rollers 186 mounted on shafts 187, which are supported in suitable bearings in the end beams 185.

As shown in FIG. 15, all of the shafts except the shafts 187″ on one side of the frame and the shaft 187' on the other side of the frame, mount a pair of sprocket wheels 188, and the shafts 187″ and 187' each mounts a single sprocket wheel 188'. The sprocket wheels 188 are interconnected by associated sprocket chains so that upon rotation of shaft 187″ all of the rollers 186 will rotate simultaneously in the same direction.

In order to rotate said rollers, a motor 191 is provided mounted on the frame 181 and operatively connected to the shaft 187″ to rotate the latter.

Desirably, in view of the length of the rollers 186 they are supported at their mid section by a pair of rollers 192 (FIGS. 15, 16) mounted on a transverse support beam 193 positioned beneath said rollers 186.

The lower support beam 194 of the frame 181 mounts an upstanding guide post 195 at each corner and also has a central support pad 196 secured thereto. Mounted on each of the support pads 196 is a pneumatic actuator 197 which serves to raise and lower a carriage 198 that carries the support slats 233 of the takeoff unit.

As shown in FIG. 15, the carriage 198 comprises two elongated spaced parallel side beams 201 and 202 between which are secured at each end transverse support beams 203 and 204. Each end of the side beams 201, 202 carries a longitudinally extending bracket 205 with a vertical hub 205' at each end through which an associated guide post 195 may extend. The transverse beams 203 and 204 each mounts a bracket 206 having spaced parallel arms between which extends a pin 207 to which the piston rod 208 of the actuating cylinders 197 are connected.

As a result of such construction, it is apparent that upon actuation of the cylinders 197, the carriage 198 can be raised and lowered. To maintain the carriage 198 in a horizontal plane, an upstanding guide arm 209 is provided secured to each of the transverse beams 194. Each arm has a vertical guide edge 211 to which a rack 212 is secured adapted to be engaged by an associated pinion 213 secured to the end of an equalizer shaft 214 which extends through suitable bearings in the transverse beams 203 and 204 as shown. An intermediate transverse beam 215 is provided to support said equalizer shaft.

Extending transversely between the side beams 201 and 202 of the carriage 198 inwardly spaced from the ends thereof are pivot shafts 216 and 217. Each of these shafts has a bell crank 218 secured thereto adjacent each of its ends. The upper legs of the bell cranks support a slat frame 219 shown in FIG. 15. The slat frame comprises a plurality of parallel angle bars 221 extending transversely with respect to the carriage 198. Secured to the rear of the angle bars near each end thereof is a block 222 to which the free end of the upper leg 223 of each bell crank 218 is pivotally connected as at 224. The free end of the lower leg 225 of the bell cranks 218 adjacent the side 202 of the carriage 198 are joined by a connecting rod 226.

The free ends of the lower legs 225 of the bell cranks 218 adjacent the side 202 of the carriage 198 are pivotally connected respectively to the piston rod 227' of an associated actuator 227, pivotally connected to a bracket 228 secured to side beam 202. Thus, upon energization of the actuators 227 and rotation of the associated bell cranks 218, the angle bars 221 will be moved in a clockwise and counterclockwise direction as the case may be.

Each of the angle bars has a plurality of upstanding sockets 231 spaced along the length thereof in which are mounted upstanding posts 232 to the upper ends of each longitudinally aligned pair of which are secured an elongated slat 233.

Figure 19:
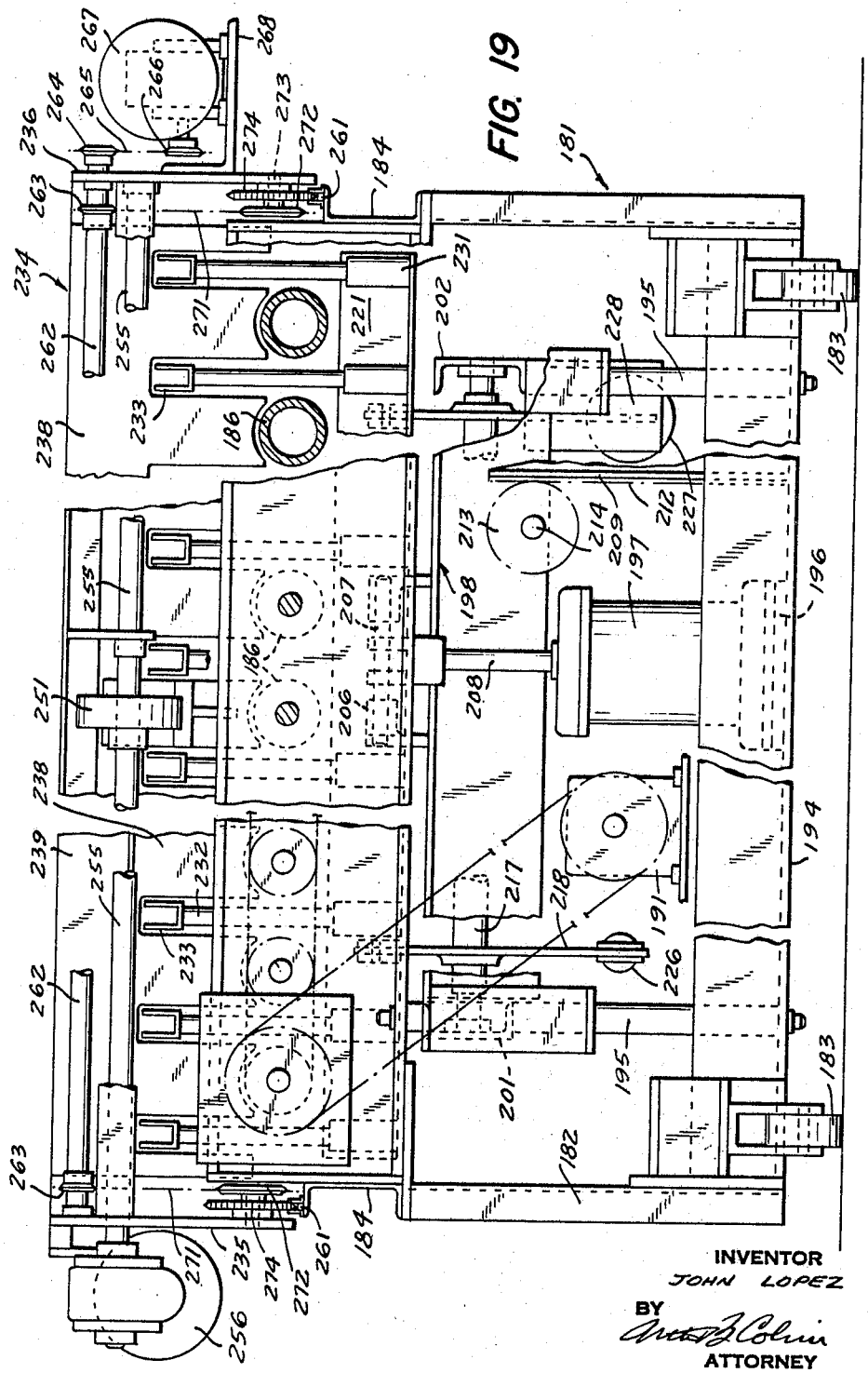
FIG. 19 is a transverse sectional view taken along line 19—19 of FIG. 15.

As is clearly shown in FIGS. 16 and 19, the carriage 198 is positioned beneath the rollers 186 with the slats 233 extending upwardly between adjacent pairs of rollers 186 so that such slats may be moved from a plane above the rollers as shown in full lines at I in FIG. 16, to a second position shown at II in which they are just slightly above the rollers and to a third position shown at III in which the upper edges of the slats are slightly below the upper plane of the rollers.

The takeoff unit has means provided to square the sheets of corrugated board discharged thereon.

As shown in FIGS. 15 and 17, for example, such means comprises a squaring assembly or carriage 234 which comprises a pair of spaced parallel side plates 235, 236 connected by transverse beams 237 to form a rigid unit. The carriage supports a squaring plate 238 illustratively rectangular as shown and having an angle beam 239 secured to the upper edge thereof.

As shown in FIGS. 15, 17 and 18, each of the side plates 235 and 236 on its inner surface adjacent its upper edge mounts a pair of longitudinally spaced rollers 241. Each end of the squaring plate 238 has a bar 242 secured thereto and extending rearwardly therefrom, each of said bars mounting on its outer surface a pair of vertically spaced elongated horizontal guide flanges 243 and 244. As shown in FIG. 18, the upper guide flange 243 rests on the rollers 241 and the lower guide flange 244 is slightly spaced from the undersurface of the rollers to prevent cocking of the squaring plate 238 as it is reciprocated in the manner now to be described to perform the squaring action.

As shown in FIGS. 15 and 17, the squaring plate 238 has secured thereto on its rear surface an outstanding block 245 to which is pivotally connected as at 246 a clevis 247 connected to the piston rod 248 of a pneumatic actuator 249. The pneumatic actuator, as shown in FIG. 17, has its casing secured to a coupling member 251 which has a central bore 252 in which a bushing 253 is rotatably mounted, the bushing 253 having an off center opening 254 through which a drive shaft 255 extends eccentrically to mount said bushing, said bushing being secured to said drive shaft.

As shown in FIG. 15, the drive shaft 255 extends transversely through the side plates 235 and 236 and one end of said drive shaft is driven by a suitable motor 256. Thus, upon rotation of said shaft 255 by said motor, the bushing 253 will rotate in the opening 252 in coupling 251 to cause said coupling to be reciprocated and through the coupling and the pneumatic actuator 249 reciprocating the squaring plate 238.

The function of the actuator 249 is to retract the squaring plate 238 independently of the reciprocatory movement imparted thereto for the purpose hereinafter to be described.

The squaring assembly 234 is movably mounted on the side beams 184 of the frame 181. To this end each of said side beams, as shown in FIGS. 15 and 19, mounts a length of sprocket chain 261. Extending transversely between the sideplates 235 and 236 is a drive shaft 262 rotatably mounted on the side plates and carrying sprocket wheels 263 on the inner side thereof. To rotate the shaft 262, the end of said shaft 262 protrudes beyond plate 236 and mounts a sprocket wheel 264 which is connected by a sprocket chain 265 to a sprocket wheel 266 driven by motor 267, carried by the plate 236 on a suitable bracket 268. The sprocket wheels 263 are connected by sprocket chains 271 to sprocket wheels 272 secured respectively to stud shafts 273 rotatably mounted on plates 235, 236 and extending inwardly thereof. The shafts 273 also mount sprocket wheels 274 which ride on sprocket chains 261. Thus, upon rotation of said shaft 262 through the drive mechanism thus described, the sprocket wheels 274 will rotate to move the squaring assembly 234 along the track defined by the sprocket chains 261 in the desired direction depending upon the direction of rotation of the motor.

To support the squaring assembly 234, a pair of angle members 281 are secured to the inner surface of each of the side plates 235, 236 adjacent their lower edges. The lower edge of each angle member rests on rollers 280 carried by the sprocket chain 261 so that the carriage 234 will be maintained in level position as it is moved forward or backward by the drive sprocket wheels 274.

Figure 20:
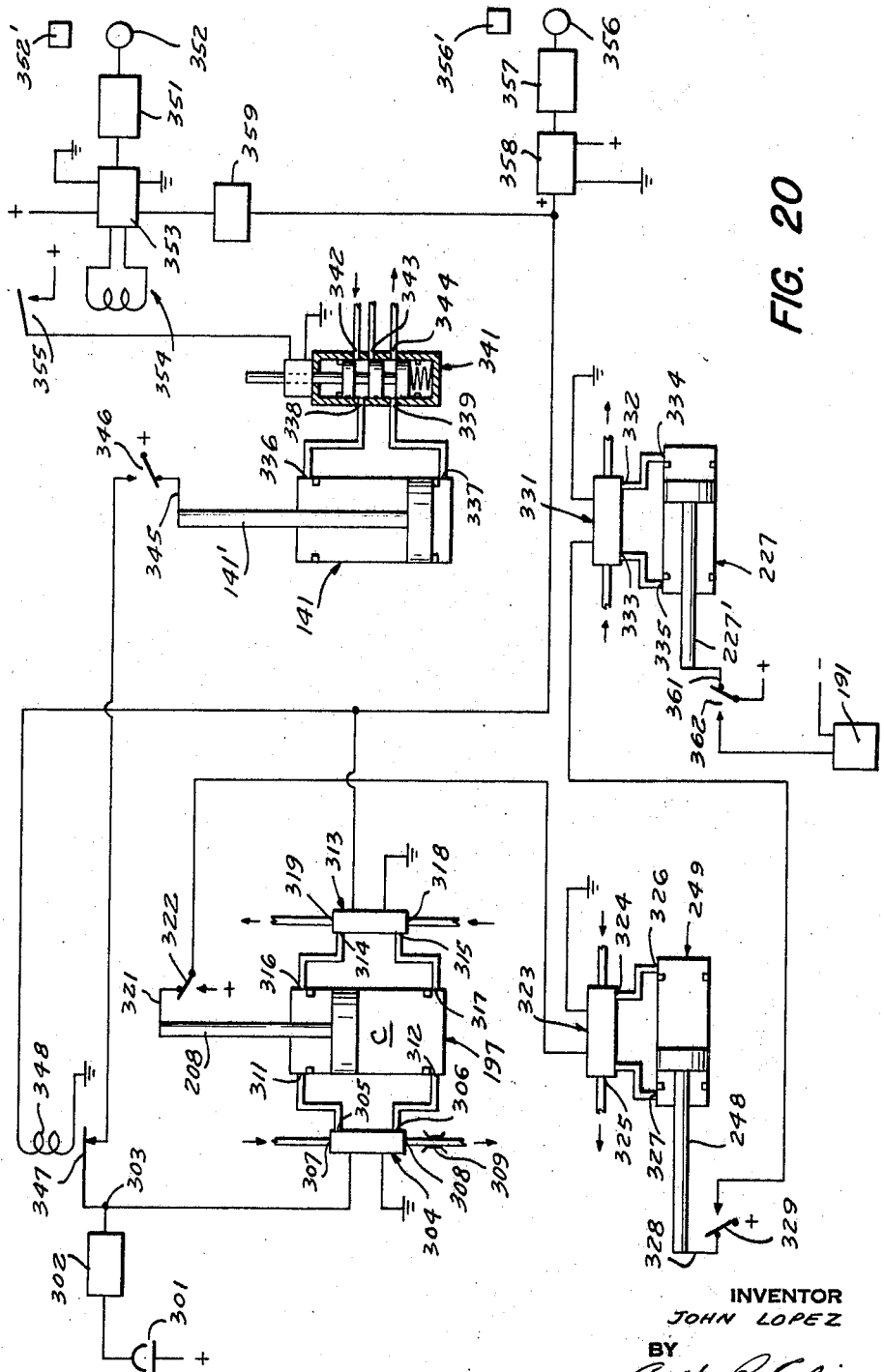
FIG. 20 is a diagrammatic view of a control circuit for the equipment.

Although any suitable circuit can be utilized to control the sequence of operation of the equipment, an illustrative control circuit is shown in FIG. 20.

A switch 301, illustratively a length of tape having a pair of normally spaced contacts therein, is mounted on plate 238 as shown in FIG. 17 at a level above that of slats 233 in their most elevated position as shown at I in FIG. 16.

The tape switch 301 is connected to a pulsing unit 302 whose output 303 is connected to normally closed valve 304. The valve has two outlet ports 305, 306 adapted to be connected to air pressure inlet port 307 and exhaust port 308 respectively when the valve is actuated, the exhaust port having an associated restrictor 309.

The outlet ports 305, 306 are connected to ports 311, 312 of actuator 197 so that when spurts of air under pressure are applied to port 311 as the valve is actuated, the piston rod 208 of actuator 197 will be retracted in discrete increments. In addition, a normally closed resetting valve 313 is also provided having pressure ports 314, 315 connected to the ports 316, 317 of the actuator 197, said valve having an air pressure port 318 adapted to be connected to port 315 and an exhaust port 319 adapted to be connected to port 314 when the valve 313 is actuated.

The piston rod 208 of actuator 197 carries a fixed arm 321 adapted to close normally open switch 322 when the piston rod 208 has been fully retracted to complete a circuit to a reversing valve 323 which has pressure ports 324, 325 connected to the ports 326, 327 of actuator 249. In normal position of valve 323, before switch 322 is closed, air under pressure is applied to port 326 of actuator 249 and the port 327 of actuator 247 is connected to exhaust. As a result, the piston rod 248 of actuator 249 will normally be extended.

The piston rod 248 of actuator 249 carries a fixed arm 328 adapted to close normally open switch 329 when the piston rod 248 has been fully retracted to complete a circuit to reversing valve 331 which has pressure ports 332, 333 connected to the ports 334, 335 of actuator 227. In normal position of valve 331 before switch 329 is closed, air under pressure is applied to port 335 of actuator 227 and the port 334 of actuator 227 is connected to exhaust. As a result, the piston rod 227' of actuator 227 will normally be retracted.

When actuator 227 is fully extended, a fixed arm 361 carried by piston rod 227' will close normally open switch 362 to complete a circuit to motor 191 driving the rollers 186 to effect rotation thereof.

The ports 336, 337 of gate actuator 141 are connected to the pressure ports 338, 339 of valve 341 which in its normal position prior to actuation will connect the port 338 to a source of air under pressure and the port 339 to exhaust. As a result, the piston rod 141' of actuator 141 will normally be retracted.

When valve 341 is actuated, the pressure inlet port 342 thereof will be closed and the two ports 336, 337 of the actuator 141 will both be connected to exhaust ports 343, 344 of the valve so that the piston rod 141' is free to move upwardly from the position shown.

The piston rod 141' of actuator 141 carries a fixed arm 345 adapted to close normally open switch 346 when the piston rod has been fully extended to complete a circuit through the normally closed contacts 347 of a relay 348 to the valve 304.

The valve 341 is controlled by a counting unit which comprises an amplifier 351 connected to a photocell 352 which has an associated source of light 352' to cause impulses to be delivered to a counting member 353 each time the light to the photocell 352 is interrupted.

The photocell 352 and light source 352' are positioned as shown in FIG. 4 in the path of the sheets B discharged by conveyer R.

The counting member 353 may be of any conventional type such as a stepping switch which may be preset to close a circuit to a relay 354 when a desired number of sheets has been counted.

The normally open contacts 355 of relay 354 are connected to the valve 341 to actuate the latter when the desired count has been obtained.

In order to reset the system, a photocell 356 having an associated source of light 356' is connected through amplifier 357 to a pulsing unit 358 which will deliver a resetting pulse of desired duration after the light to the photocell 356 has been interrupted by a stack of sheets and then is restored after the stack has moved past the photocell.

Figure 2:
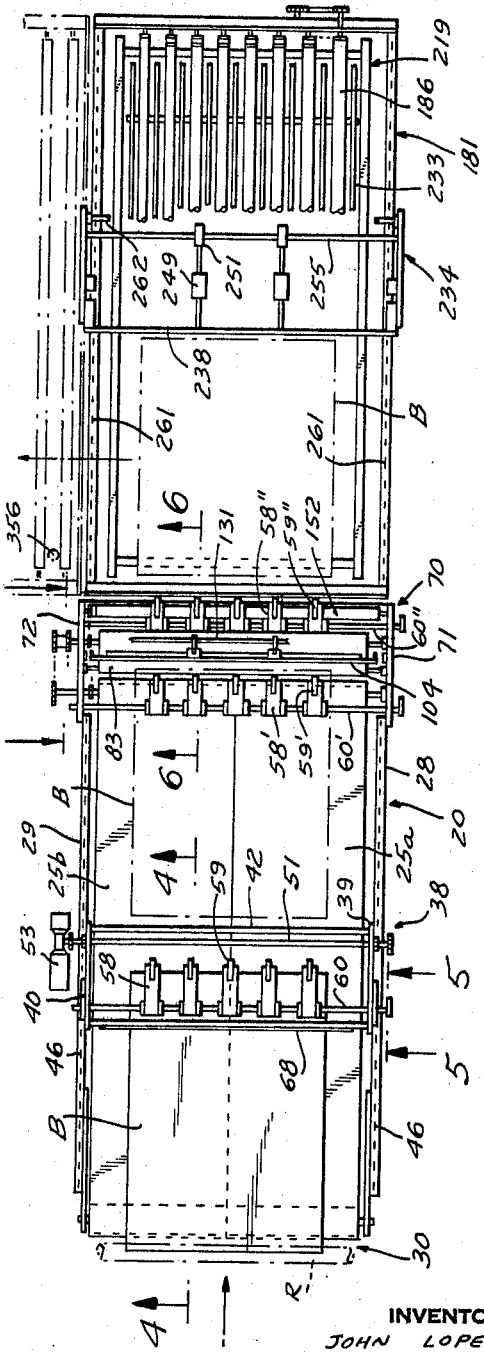
FIG. 2 is a top plan view taken along line 2—2 of FIG. 1.

The output of pulsing unit 358 is connected to the coil of relay 348 to energize the latter to open contacts 347 and is also connected through time delay unit 359 to the counting member 353 to reset the latter after a predetermined interval has elapsed after the contacts 347 have been opened for the purpose hereinafter to be described The photocell 356 and associated source of light are positioned as shown in FIG. 2 in the path of the stack of sheets discharged from the takeoff unit 170 to effect the resetting operation in the manner to be described.

OPERATION

According to one application of the invention, a corrugator equipment which forms continuous strips of corrugated board, feeds such continuous strips to a cutting machine which forms sheets of corrugated board which are of the length desired. The outlet of the cutting machine feeds into the discharge conveyer R.

The speed of advance of the strips from the corrugator and the speed of the cutting machine are the same. The speed of advance of the discharge conveyer R is slightly faster to effect sheet separation.

The motor 76 shown in FIG. 11 which drives the roller 24 of the conveyer 25 is synchronized with the rate of advance of the discharge conveyer R, for example, and illustratively drives the roller 24 at one-half the speed of the discharge conveyer R so that the conveyer belts 25a, 25b will advance at one-half the speed of the discharge conveyer R.

The position of the carriage 38, shown in FIGS. 1, 2, 3 and 4, for example, is adjusted by energizing the motor 53, which through the drive imparted by sprocket wheels 44 will move the carriage 38 toward and away from the inlet 30 as desired.

Referring to FIG. 4, the carriage is located so that the nip end of the hold down rollers 59 will be located in a position such that the leading edge L of sheet B will be just under the nip N when its trailing edge T is at the nip N' of the discharge conveyer R. The purpose of this arrangement is to insure that at no time will be the sheet B be free to move, but it will be either engaged by the hold down rollers 59 or by the discharge conveyer R. The position of the various hold down rollers 59, 59', 59" are adjusted by movement of the associated reversible ratchet arms 67, 67' and 67" so that the hold down rollers are uniformly aligned on each side of the center line of the advancing sheets.

When the equipment is turned on, the gate 104 controlled by actuator 141 is in its raised or open position as the piston rod 141' of said actuator is retracted. The carriage 198 controlled by actuators 197 is in its raised position as the piston rods 208 of said actuators are extended. The oscillating back stop 234 controlled by actuator 249 is in its extended position as the piston rod 248 of said actuator is extended and the slat carrier controlled by actuators 227 is in its raised position as the piston rods 227' of said actuators are in their retracted position.

As shown in FIG. 4, for example, as the sheets B are successively discharged by the conveyer R, they will first abut against the deflector apron 68 and will be cammed downwardly quickly beneath the hold down rollers 59 which will urge the leading edge of the sheets against the moving conveyer belts 25a, 25b.

As a result, the sheets B will be advanced at a rate of speed one-half that of the rate at which they are being discharged by the conveyor R. When approximately one-half of the length of the lower sheet B has been advanced beneath the hold down rollers 59, the next sheet B will be discharged by the discharge conveyer R into the nip N of the hold down rollers 59 and thereupon two sheets will be advanced by reason of the force exerted by the hold down rollers 59. This operation will continue and as is clear, the sheets on the conveyer belts 25a, 25b will be advanced in shingled relationship.

Referring to FIG. 7, as the shingled sheets are advanced by the conveyer belts 25a, 25b, they will pass under the hold down rollers 59' (FIG. 3), onto the conveyer 83 and beneath the raised gate 104 and then beneath the hold down rollers 59" which urges the sheets against the discharge roller 152 which is driven at the same rate of speed as the conveyer 83.

The sheets will thus be ejected one by one onto the raised slats 233 of the take-off unit 170, abutting against the back stop 238 thereof (FIG. 16), which is oscillating by reason of the drive imparted thereto from shaft 255.

By reason of the suction imparted by fan 163 (FIG. 2) through slots 158, the sheets will quickly drop onto the slats 233 and be moved against the bar 157 (FIG. 7) by reason of the movement of the back stop 238, to square the sheets.

As each sheet is discharged by conveyer R into the inlet 30 of the conveyer unit 20, it will interrupt the light to photocell 352 (FIGS. 4, 20) which through amplifier 351 will deliver a pulse to the counter 353 which will count such sheets.

After several sheets are discharged and piled upon the slats 233, say, when two or three sheets have collected, the leading edge of the topmost sheet will abut against the tape switch 301 closing the latter. As a result, referring to FIG. 20, a circuit will be closed to the pulser 302 which in turn will deliver a pulse to valve 304 to open the latter for a short interval.

This will cause a short burst of air under pressure to enter port 311 of actuator 197 to move the piston rod 208 thereof downwardly, a small increment, the restrictor 309 limiting the speed of such downward movement.

As a result of such downward movement of the piston rod 203, the carriage 219 and hence the slats 233 carried thereby will also move downwardly, so that the sheets will be clear of the tape switch 301 and valve 304 will be closed.

As additional sheets are discharged to increase the height of the pile or stack, the tape switch 301 will again be closed and the operation above described will be repeated with the carriage 219 being lowered in steps as the stack builds up in height.

At the same time as such incremental lowering of the carriage 219 is taking place, pulses are being delivered to the counter 353.

When a predetermined number of sheets has been discharged into the conveyer unit 20, the counter 353 will have reached its preset position and hence a circuit will be completed to relay 354 to close its switch contacts 355.

As a result, the circuit to valve 341 will be completed to actuate the latter. This will cut off flow of air under pressure to port 336 of actuator 141, and connect the ports 336 and 337 of said actuator 141 to atmosphere. Consequently, there will be nothing to impede the rapid downward movement by gravity of the heavy gate 104 to the position shown in FIG. 6.

At this time there could be a sheet B still advancing beneath the gate 104 and hence the roller 121 carried by the gate would engage such sheet to press the latter against the conveyer belt 83 so that such sheet B would continue to be advanced at a relatively high rate of speed onto the pile or stack thus far formed on the slats of the take off unit.

As shown in FIG. 6, the leading edge of the sheet B$^t$ above the lowermost sheet B$^b$, has abutted against the lower portion of the lowered gate 104 and is restrained by such gate. When the lowermost sheet B$^b$ has been moved clear of the gate, the latter will fall a slight additional distance limited by the abutment of roller 121 against conveyer belt 83, as shown in FIG. 8.

In this position the lower edge 151 of the gate is slightly spaced from the upper run 84 of conveyer belt 83 by a distance less than the thickness of the sheet so that it cannot pass thereunder. As the conveyer belts 25a, 25b continue their movement, the shingled sheets will gradually move closer and closer as shown in FIG. 8.

When the gate 104 moved to its lowermost position as above described, which lifts the piston rod 141' to its topmost position, a fixed arm 345 (FIG. 20) carried by the piston rod 141' of actuator 141, will close switch 346 to complete a circuit through normally closed reset switch 347 to valve 304.

As a result, the valve 304 would be continuously energized, to cause the piston rod 208 of actuator 197 to be moved to its lowermost position which would move the slats 233 to the position shown in FIG. 16 at II, where the slats 233 are just slightly above the plane of the rollers 186.

When the piston rod 208 of actuator 197 moves to its lowermost position, as shown in FIG. 20, a fixed arm 321 carried by said piston rod 208 actuates switch 322 to complete a circuit to reversing valve 323.

As a result, air under pressure will be applied to port 327 of actuator 249 to retract its piston rod 248, thereby moving the oscillating back stop 238 away from the associated edges of the stack of sheets on slats 233.

When the back stop 238 has been fully retracted, a fixed arm 328 carried by piston rod 248 will actuate switch 329 to complete a circuit to reversing valve 331.

As a result, air under pressure will be applied to ports 334 of actuators 227 to extend the piston rods 227' thereof, thereby pivoting the bell cranks 218 in a clockwise direction from the position shown in FIG. 16. This will cause the slats 233 to move downwardly and to the right from the position shown in FIG. 16 at II to the position shown in FIG. 8 at III where the slats 233 are below the rollers 186. Thus, the edges of the sheets will be moved away from the squaring bar 157 and the stack of sheets will be deposited onto the rollers 186. When the piston rods 227' of actuators 227 are fully extended, the fixed arm 361 carried by one of said piston rods will close switch 362 to complete a circuit to motor 191 to energize the latter to effect rotation of rollers 186. Thus, the stack will be advanced by the rollers 186 away from the discharge outlet of the conveyer unit 20, in direction at right angles thereto.

The stack is moved by such rollers 186 onto a conventional receiving table positioned adjacent the rollers. As shown in FIG. 2 and FIG. 20, as the leading edge of the stack starts to move off the rollers 186, it will intercept the light to photocell 356. When the trailing edge of said stack passes the photocell 356 which is again energized by a source of light, a pulse of predetermined duration is delivered by a conventional pulsing unit 358 to reset the equipment.

Thus, the pulse would be delivered to relay 348 to open its contacts 347 to break the circuit to valve 304 so that the latter would close. At the same time, a pulse would be delivered to valve 313 to open the latter so that air under pressure would be delivered to ports 317 of actuators 197 to raise the piston rods 208 thereof, thereby lifting the carriage 219 and slats 233 to the position shown at I in FIG. 16 and charging the chamber C beneath the piston of actuator 197 with gas under pressure which maintains the piston rod in extended position.

Since the valve 304 (FIG. 20) is retained open by the closing of gate switch 346 when the gate was lifted, valve 304 must first be closed as above described to permit resetting of actuators 197 by the energization of valve 313.

Upward movement of the piston rods 208 would cause switch 322 to open, thereby breaking the circuit to reversing valve 323 which would then apply gas under pressure to port 326 of actuator 249 to extend the piston rod 248 thereof to restore the back stop 238 to its operating position.

Movement of piston rod 248 would open switch 329 to break the circuit to reversing valve 331, which would then apply gas under pressure to port 335 of actuators 227 to retract the piston rods 227' thereof, thereby pivoting the bell cranks 218 in a counterclockwise direction to the position shown in FIG. 16 and raising the slats to position I as well as moving them to the left.

As a result of such movement of piston rod 227' switch 362 would be opened to break the circuit to motor 191 so that rollers 186 would stop rotating.

It is to be noted that the gate 104 is still in its lowered position as shown in FIG. 8 to prevent discharge of sheets onto the take off unit until it is fully reset.

Now that the take off unit has been fully reset, it is to be noted that the unit 358 (FIG. 20) also delivered a resetting pulse to time delay unit 359 which after a predetermined period of time sufficient to permit resetting of actuators 197, 249 and 227 then delivered a resetting pulse to counter unit 353 which reset the latter to zero. This causes relay 354 to be de-energized to open its contacts 355 thereby breaking the circuit to valve 341 which is spring returned to its neutral position. As a result, air under pressure is applied to port 336 of actuator 141 to retract the piston rod 141' thereof. This will exert force on the turnbuckle 139 and chain 136 (FIG. 11) to cause the sprocket wheel 135 to rotate in a counterclockwise direction. As a result, referring to FIGS. 6, 7 and 8, the shaft 131 will be rotated (in a clockwise direction) as shown in FIGS. 6, 7 and 8, thereby rotating the sprocket wheels 142 in the same direction to impart upward force on the sprocket chains 143 which are connected to the gate 104. Consequently, the gate 104 will be quickly raised.

As a result, due to the drive imparted by the conveyer belts 25a, 25b, the stack of sheets S (FIG. 8) will be advanced beneath the gate and the stack will be compressed between the hold down rollers 59" and drive discharge roller 152 and discharged onto the raised slats 233 and the operation above described will repeat.

As previously described, the shaft 81 of the speedup conveyer belt 83 is driven at a minimum speed determined by the speed of rotation of sprocket wheel 91 (FIG. 13) by motor 99 and at a maximum speed determined by the speed of rotation of sprocket wheel 92 which is driven by the motor 76 shown in FIG. 11.

Thus, the conveyer belt 83 is driven at the same rate of speed as the conveyer belts 25a, 25b assuming that such belts are driven at a speed greater than the speed of the motor 99.

In the event that for some reason the corrugator should be slowed down, so that the speed of discharge of sheets from the discharge conveyer R should also be slowed down, due to the clutch arrangement previously described and connected to the shaft 81 of the speedup conveyor, the motor 99 will take over, so that at all times the sheets will be discharged at a speed no less than a predetermined amount to insure that the sheets will be ejected at a sufficiently high rate of speed to move across the width of the takeup unit against the oscillating backstop.

It is a feature of the equipment to permit ready setup to handle successive runs of sheets that differ in length. To this end, as shown in FIG. 9, a microswitch 450 is carried by plate 39 of carriage 38. The side rail 28 has a bar 451 mounted thereon which carries a movable trigger arm 452.

Thus, after the carriage 38 has been set to a given position depending upon the length of a run of sheets to be processed, the trigger arm is moved to a position suitable for setting the carriage for the next run of sheets.

Thereupon, when the first run is completed, it is merely necessary for the operator to energize the motor 53 in direction to move the trigger arm toward the microswitch 450 and when the arm 452 engages the micro-switch 450, the motor 53 will automatically cut off with the carriage set in the desired position.

With the equipment above described, sheets of corrugated board fed at a relatively high rate of speed may be dependably assembled into uniform stacks without need for any manual handling.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. Apparatus for conveying and stacking flat sheets comprising a feeding conveyer having an inlet end and an outlet end, and a take-off conveyer having an inlet end and an outlet end, said conveyers being disposed in association with each other, means for continuously advancing said feeding conveyer, said take-off conveyer being positioned to effect movement of sheets discharged thereon from the outlet of said feeding conveyer, in direction at right angles to the direction of such discharge, means for advancing said take-off conveyer, a vertically movable gate positioned adjacent the outlet end of said feeding conveyer and adapted to interrupt feed of the sheets therefrom onto said take-off conveyer, a speed up conveyer positioned between the outlet end of said feeding conveyer and the inlet of said take-off conveyer and located beneath said vertically movable gate, means to effect advance of said speed up conveyer at the same rate of speed as said feeding conveyer, means to effect advance of said speed up conveyer at a rate of speed no less than a predetermined amount regardless of the speed of said feeding conveyer, and means when a predetermined quantity of sheets has been discharged onto said take-off conveyer to form a stack of desired height, to lower said gate to interrupt further discharge of sheets onto said take-off conveyer and means after said gate has been lowered to effect movement of said stack of sheets from said take-off conveyer.

2. The combination set forth in claim 1 in which a holddown carriage is associated with said feeding conveyer, said carriage extending transversely across said feeding conveyer, means to effect movement of said carriage toward and away from the inlet to said feeding conveyer, said holddown carriage having a shaft extending transversely thereacross, a plurality of spaced parallel arms pivotally mounted at one end on said shaft, said arms being adapted to retain the sheets advanced by said conveyer against the latter.

3. The combination set forth in claim 2 in which said carriage has a flexible apron mounted thereon and extending transversely thereacross, said apron being positioned between the inlet end of said feeding conveyer and said arms and adapted to deflect the sheets discharged onto said conveyer downwardly beneath the free ends of said arms.

4. The combination set forth in claim 2 in which each of said arms has a roller at its free end.

5. The combination set forth in claim 2 in which said feeding conveyer has a pair of parallel longitudinally extending side bars each having a track, a rotary drive member is mounted on said carriage on each side thereof and respectively engage an associated track, and means to energize said drive members to effect movement of said carriage toward and away from the inlet of said conveyer.

6. The combination set forth in claim 4 in which means are provided to effect transverse movement of said shaft to effect desired positioning of said plurality of rollers with respect to the sheets on said conveyer.

7. The combination set forth in claim 1 in which said gate comprises a substantially rectangular plate, guide means are provided for said plate to insure vertical movement thereof, and a solenoid is provided having a piston rod operatively connected to said plate to lift the latter when said solenoid is actuated.

8. The combination set forth in claim 7 in which a roller is idly mounted on said plate and extends longitudinally thereof transversely across said conveyer, said roller being adapted to move against said speed up conveyer when said gate is in its lowermost position.

9. The combination set forth in claim 8 in which the lower edge of said plate is spaced from said speed up conveyer by a distance less than the thickness of one of such sheets when said roller is moved against said speed up conveyer.

10. The combination set forth in claim 1 in which said gate comprises a substantially rectangular plate, a pair of upstanding support members straddle said feeding conveyer in alignment with said gate, a pair of spaced angle members is affixed to each of said support members, on the inner sides thereof, each of said angle members having an inwardly extending vertical arm, a pair of substantially vertically aligned shafts extending outwardly beyond each of the ends of said plate and carried by the latter, each of said shafts carrying a pair of rotary members on each and thereof adapted to coact respectively with the inwardly extending arms of each pair of angle members to provide vertical guidance for said plate and a solenoid having a piston rod operatively connected to said plate to lift the latter when said solenoid is actuated.

11. The combination set forth in claim 10 in which one of said rotary members is a pinion and the other is a disc, one of said inwardly extending arms on each of said support members carrying a rack engaged by the associated pinion, said disc engaging the other inwardly extending arm.

12. The combination set forth in claim 10 in which a shaft extends transversely across said conveyer being rotatably mounted on said support members, one end of said shaft extending beyond its associated support member, a disc secured to said extending end of said shaft, a cable having one end secured to said disc and riding around the periphery thereof and the other end operatively connected to said solenoid, said shaft having a pair of discs mounted thereon and spaced therealong, each of said discs having a cable secured thereto at one end and riding around the periphery thereof, the other end of said cables being secured to said plate, said last-named cables extending in direction opposed to said first named cable whereby when said solenoid is actuated and tension is applied to the associated cable to rotate the disc and shaft, said cables connected to said plate will have tension exerted thereon to lift said plate.

13. The combination set forth in claim 1 in which a pair of upstanding support members straddle said feeding conveyer in alignment with said gate, a discharge roller extends transversely across said support members in the path of movement of the sheets discharged by said speed up conveyer, said discharge roller being rotatably mounted between said support members, and drive means operatively connecting said discharge roller to said speed up conveyer for rotation of said discharge roller at the same rate of speed as said speed up conveyer.

14. The combination set forth in claim 13 in which a shaft extends transversely between said support members, a plurality of spaced parallel arms are pivotally mounted at one end of said shaft, each of said arms carrying a roller at its free end substantially vertically aligned with said discharge roller.

15. The combination set forth in claim 14 in which a vertical plate is positioned adjacent said discharge roller and extends parallel thereto below the plane of the top surface of said roller, said take-off conveyer having a vertical plate associated therewith, extending parallel to and spaced from said first vertical plate, and means to oscillate said second vertical plate to square the stack of sheets on said take-off conveyer.

16. The combination set forth in claim 1 in which said feeding conveyer comprises a pair of spaced parallel rollers, an endless conveyer belt encompassing said rollers, a shaft mounting the roller adjacent the outlet of the conveyer, said roller being secured to said shaft, drive means operatively connected to said shaft to rotate the latter and said conveyer means, said speed up conveyer comprises a pair of spaced parallel rollers, an endless conveyer belt encompassing said rollers, a shaft mounting one of said rollers, said roller being secured to said shaft, a clutch member mounted on the shaft of said speed up conveyer, said clutch member comprising a fixed member secured to said shaft and two members rotatably mounted on said shaft, means operatively connecting one of said rotary members to the shaft of said feeding conveyer to be driven thereby, means operatively connected to the other rotary member to rotate the latter, and means operatively connecting said fixed member to which ever of the rotary members that is driven at the greater speed to rotate said fixed member and the shaft of said speed up conveyer to advance the latter.

17. The combination set forth in claim 16 in which a discharge roller extends parallel to said speed up conveyer in the path of movement of the sheets discharged from the latter, means rotatably mounting said discharge roller, said discharge roller being operatively connected to the driven shaft of said speed up conveyer for rotation of said discharge roller at the same rate of speed as said speed up conveyer.

18. The combination set forth in claim 16 in which said fixed member comprises a hub secured to the shaft of said speed up conveyer, said hub having ratchet teeth in its periphery, said rotary members comprise a pair of sprocket wheels rotatably mounted on said shaft and straddling said hub, each of said sprocket wheels having a pawl pivoted thereto and resiliently urged against the periphery of said hub, whereby said hub will be driven by whichever of said sprocket wheels is rotated at the greater speed.

19. The combination set forth in claim 14 in which said take-off unit is positioned in the path of movement of the sheets discharged by said discharge roller, said take-off unit comprising a horizontal support onto which the sheets are discharged, a vertical plate positioned adjacent said discharge roller and extending parallel thereto below the plane of the top surface of said roller and extending above the plane of said horizontal support, said support having a vertical plate extending transversely thereacross parallel to said first plate and spaced therefrom, and means to oscillate said second plate slightly toward and away from said first plate whereby sheets discharged by said discharge roller onto said horizontal support will abut against said second plate and be moved thereby against said first plate to square the stack of sheets built up on said horizontal support.

20. The combination set forth in claim 19 in which said first plate has a plurality of apertures therein and means to provide suction through said apertures whereby the sheets discharged onto said horizontal support will dependably move downwardly thereagainst without skewing.

21. A feeding conveyer adapted to receive sheets discharged thereon, said feeding conveyer having an inlet and an outlet end, means for continuously moving said conveyer to advance such sheets, a vertically movable gate positioned at the outlet end of the feeding conveyer and extending transversely thereacross and adapted to interrupt discharge of sheets therefrom, a speed up conveyer positioned at the outlet end of said feeding conveyer and extending transversely thereacross, means to effect advance of said speed up conveyer at the same rate of speed as said feeding conveyer, means to effect advance of said speed up conveyer at a rate of speed no less than a predetermined amount regardless of the speed of said feeding conveyer, and means to lower said gate to interrupt discharge of sheets from said feeding conveyer after a predetermined number of sheets have been advanced by said feeding conveyer.

22. The combination set forth in claim 21 in which a hold down carriage is associated with said feeding conveyer, said carriage extending transversely across said feeding conveyer, means to effect movement of said carriage toward and away from the inlet to said feeding conveyer, said hold down carriage having a shaft extending transversely thereacross, a plurality of spaced parallel arms pivotally mounted at one end on said shaft, said arms being adapted to retain the sheets advanced by said conveyer against the latter.

23. The combination set forth in claim 21 in which said gate comprises a substantially rectangular plate, guide means are provided for said plate to insure vertical movement thereof, and a solenoid is provided having a piston rod operatively connected to said plate to lift the latter when said solenoid is actuated.

24. The combination set forth in claim 21 in which said gate comprises a substantially rectangular plate, a pair of upstanding support members straddle said feeding conveyer in alignment with said gate, a pair of spaced angle members is affixed to each of said support members, each of said angle members having an inwardly extending arm, a pair of substantially vertically aligned shafts extending outwardly beyond each of the ends of said plate and carried by the latter, each of said shafts carrying a pair of rotary members on each end thereof adapted to coat respectively with the inwardly extending arms of each pair of angle members to provide vertical guidance for said plate and a solenoid having a piston rod operatively connected to said plate to lift the latter when said solenoid is actuated.

25. The combination set forth in claim 24 in which a shaft extends transversely across said conveyer being rotatably mounted on said support members, one end of said shaft extending beyond its associated support member, a disc secured to said extending end of said shaft, a cable having one end secured to said disc and riding around the periphery thereof and the other end operatively connected to said solenoid, said shaft having a disc mounted thereon, said disc having a cable secured thereto at one end and riding around the periphery thereof, the other end of said cable being secured to said plate, said last-named cable extending in direction opposed to said first named cable whereby when said solenoid is actuated and tension is applied to the associated cable to rotate the disc and shaft, said cable connected to said plate will have tension exerted thereon to lift said plate.

26. The combination set forth in claim 21 in which a pair of upstanding support members straddle said feeding conveyer in alignment with said gate, a discharge roller extends transversely across said support members in the path of movement of the sheets discharged by said speed up conveyer, said discharge roller being rotatably mounted between said support members, and drive means operatively connecting said discharge roller to said speed up conveyer for rotation of said discharge roller at the same rate of speed as said speed up conveyer.

27. The combination set forth in claim 26 in which a shaft extends transversely between said support members, a plurality of spaced parallel arms are pivotally mounted at one end of said shaft, each of said arms carrying a roller at its free end substantially vertically aligned with said discharge roller.

28. The combination set forth in claim 27 in which means are provided to effect transverse movement of said shaft and the pivoted arms carried thereby.

29. The combination set forth in claim 26 in which a vertical plate is positioned adjacent said discharge roller and extends parallel thereto below the plane of the top surface of said roller.

30. The combination set forth in claim 21 in which said feeding conveyer comprises a pair of spaced parallel rollers, an endless conveyer belt encampassing said rollers, a shaft mounting the roller adjacent the outlet of the conveyer, said roller being secured to said shaft, drive means operatively connected to said shaft to rotate the latter and said conveyer means, said speed up conveyer comprises a pair of spaced parallel rollers, an endless conveyer belt encompassing said rollers, a shaft mounting one of said rollers, said roller being secured to said shaft, a clutch member mounted on the shaft of said speed up conveyer, said clutch member comprising a fixed member secured to said shaft and two members rotatably mounted on said shaft, means operatively connecting one of said rotary members to the shaft of said feeding conveyer to be driven thereby, means operatively connected to the other rotary member to rotate the latter, and means operatively connecting said fixed member to whichever of the rotary members that is driven at the greater speed to said fixed member to rotate said fixed member and the shaft of said speed up conveyer to advance the latter.

31. The combination set forth in claim 21 in which a discharge roller extends parallel to said speed up conveyer in the path of movement of the sheets discharged from the latter, means rotatably mounting said discharge rollers, said discharge roller being operatively connected to the driven shaft of said speed up conveyer for rotation of said discharge roller at the same rate of speed as said speed up conveyer.

32. The combination set forth in claim 30 in which said fixed member comprises a hub secured to the shaft of said speed up conveyer, said hub having ratchet teeth in its periphery, said rotary members comprise a pair of sprocket wheels rotatably mounted on said shaft and straddling said hub, each of said sprocket wheels having a pawl pivoted thereto and resiliently urged against the periphery of said hub, whereby said hub will be driven by whichever of said sprocket wheels is rotated at the greater speed.

33. A take-off unit comprising a rectangular frame, a plurality of spaced parallel rollers mounted on said frame and lying in a horizontal plane, drive means operatively connected to said rollers to rotate the latter in unison, a plurality of spaced parallel elongated support bars extending paralled to said rollers in a horizontal plane and adapted to be moved in unison vertically between said rollers from a plane above the plane of the top surface of said rollers to a plane below the plane of the top surface of said rollers, a substantially rectangular plate extending transversely across said rollers and said support bars and above the same, and means to reciprocate said plate in direction longitudinally of said rollers and said support bars.

34. The combination set forth in claim 33 in which means provided are to effect slight lonigtudinal movement of said plate independent of the reciprocatory movement imparted thereto.

35. The combination set forth in claim 33 in which means are provided simultaneously to effect movement of said support bars with both a longitudinal and vertical component of movement.

36. A take-off unit to receive flat substantially rectangular sheets discharged thereon, comprising a rectangular frame having parallel end bars and side bars, a plurality of spaced parallel rollers mounted on said frame extending longitudinally thereof and lying in a horizontal plane, drive means operatively connected to said rollers to rotate the latter in unison, a vertical squaring plate associated with one end of said frame and extending transversely thereacross, said plate having a portion rising above the plane of said rollers, a second substantially rectangular frame mounted on said first frame, said second frame having parallel end bars and side bars, a plurality of spaced parallel sheet carrying slats mounted on said second frame and rising therefrom, said slats lying in a horizontal plane and being positioned respectively between adjacent pairs of rollers of said first frame, means to effect vertical movement of said second frame with respect to said first frame to move said slats between a position considerably above the plane of the top surface of said rollers to a position just slightly above the plane of the top surface of said rollers, means to move said slats from said position just slightly above the plane of the top surface of said rollers to a plane below the top surface of said rollers, a substantially rectangular back stop plate extending transversely across said frames and rising vertically with respect thereto, said back stop plate extending parallel to and being spaced from said first plate and means to reciprocate said back stop plate to cause the latter to abut against one edge of the sheets on said slats to move the opposed edge of such sheets into abutment with said vertical squaring plate.

37. The combination set forth in claim 36 in which means are provided, as successive sheets are discharged onto the slats of said take-off unit to effect incremental downward movement of said second frame and the slats carried thereby to the position just slightly above the plane of the top surface of said rollers and means are provided thereupon to effect movement of said reciprocatory backstop plate away from the edges of the sheets adjacent thereto while continuing the reciprocatory movement of said backstop, and means thereupon to move said slats simultaneously to provide both a vertical and longitudinal component of movement, thereby to effect movement of such slats to a position just slightly below the plane of the top surface of said rollers and to move the opposed edges of said sheets away from said squaring plate.

38. The combination set forth in claim 37 in which means are provided to effect rotation of said rollers after said slats have been moved below the plane of said rollers thereby to effect movement of the stack of sheets on said rollers.

39. The combination set forth in claim 36 in which said second frame has a pair of spaced parallel side bars, a pair of spaced parallel shafts extend transversely across said side bars, a lever pivotally mounted between its ends adjacent each end of said shafts, a cross bar extending between the upper ends of each pair of levers associated with a respective shaft, said cross bars being pivotally connected at the ends thereof to the upper end of an associated lever, a plurality of spaced upstanding parallel posts mounted on each of said cross bars, said slats being rigidly secured to the upper ends of longitudinally aligned pairs of posts, whereby said cross bars and said slats will form a rigid assembly, and means to pivot said levers in unison to effect such movement of said slats from said position just slightly above the plane of the top surface of said rollers to a plane slightly below the top surface of said rollers.

40. The combination set forth in claim 39 in which the means to pivot said levers in unison comprises actuator means mounted on one of the side bars and pivotally connected to the lower end of the lever adjacent said side bar and a rod pivotally connected at its ends to the lower ends of both of the levers adjacent the other side bar.

41. The combination set forth in claim 36 in which the means to effect vertical movement of said second frame comprises a pair of actuators vertically mounted respectively at the opposed ends of said first frame, each of said actuators having an upstanding piston rod pivotally connected to the end bars of said first frame.

42. The combination set forth in claim 41 in which each of the corners of said second frame carries a hub having a vertical bore and an associated vertical rod is secured at its lower end adjacent each of the corners of said first frame, said rods extending through the bore of an associated hub to guide the latter.

43. The combination set forth in claim 41 in which each of the corners of said second frame carries a hub having a vertical bore and an associated vertical rod is secured at its lower end adjacent each of the corners of said first frame, said rods extending through the bore of an associated hub to guide the latter, a pair of vertical guide rails extend upwardly from each of the end bars of said first frame, each of said guide rails having a vertical rack conformation, a shaft extends longitudinally through the end bars of said second frame and has a pinion rigidly secured to each end thereof engaging said rack to maintain the second frame in a horizontal plane upon movement thereof.

44. The combination set forth in claim 36 in which a carriage is provided comprising a pair of side plates and a front wall extending transversely thereacross, means rigidly maintaining said side plates in spaced parallel relation, said front wall defining said back stop plate, means slidably mounting said back stop plate on said side walls, means movably mounting said carriage on the side bars of said first frame, means to adjust the position of said carriage on said first frame, said front wall of said carriage extending transversely across said first and second frame, said front wall having a plurality of spaced parallel vertical slots to accommodate said slats, said rollers being aligned with the spaces between adjacent slots, a shaft extending through said side plates parallel to said back stop plate, means to rotate said shaft, a coupling member eccentrically mounted on said shaft and connected to said back stop plate whereby upon rotation of said shaft said back stop plate will be reciprocated.

45. The combination set forth in claim 44 in which said coupling member comprises an outer casing having a transverse circular bore, said casing being operatively connected to said back stop plate and a hub rotatably mounted in said circular bore and eccentrically mounted on said shaft and secured thereto.

46. The combination set forth in claim 45 in which said coupling member comprises an outer casing having a transverse circular bore, said casing being operatively connected to said back stop plate, a hub rotatably mounted in said circular bore and eccentrically mounted on said shaft and secured thereto, an actuator interposed between said coupling member and said back stop plate, said actuator having a casing and a piston rod, one of which is connected to said coupling and the other of which is connected to said back stop plate, whereby upon energization of said actuator said back stop plate may be retracted and advanced independently of the reciprocatory movement imparted thereto.

47. The combination set forth in claim 44 in which each of the side bars of said first frame has a track mounted thereon, each of said side plates of said carriage mounts a rotary member engaging said track and means carried by said carriage to rotate said rotary members to effect movement of said carriage along said track.

References Cited

UNITED STATES PATENTS

| 2,506,550 | 5/1950 | Morrison | 271—69 |
| 3,079,150 | 2/1963 | Lopez | 271—69 |

FOREIGN PATENTS

| 1,239,327 | 4/1967 | Germany. |

RICHARD E. AEGERTER, Primary Examiner

U.S. Cl. X.R.

271—69, 88, 89